(12) United States Patent
Siu

(10) Patent No.: US 12,483,799 B2
(45) Date of Patent: *Nov. 25, 2025

(54) SIMULTANEOUSLY CAPTURING IMAGES IN LANDSCAPE AND PORTRAIT MODES WITH MOVABLE LANDSCAPE AND PORTRAIT FRAMES, AND ADJUSTABLE ASPECT RATIOS

(71) Applicant: Donald Siu, Santa Ana, CA (US)

(72) Inventor: Donald Siu, Santa Ana, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 18/513,361

(22) Filed: Nov. 17, 2023

(65) Prior Publication Data

US 2024/0089613 A1 Mar. 14, 2024

Related U.S. Application Data

(63) Continuation-in-part of application No. 18/506,865, filed on Nov. 10, 2023, now Pat. No. 12,058,451, which is a continuation of application No. 17/822,658, filed on Aug. 26, 2022, now Pat. No. 11,818,472.

(60) Provisional application No. 63/267,360, filed on Jan. 31, 2022.

(51) Int. Cl.
*H04N 23/90* (2023.01)
*H04N 23/45* (2023.01)
*H04N 23/54* (2023.01)

(52) U.S. Cl.
CPC ............ *H04N 23/90* (2023.01); *H04N 23/45* (2023.01); *H04N 23/54* (2023.01)

(58) Field of Classification Search
CPC ...... H04N 5/2628; H04N 7/181; H04N 23/80; H04N 23/667; H04N 7/183; G08B 3/10; G08B 13/196
See application file for complete search history.

(56) References Cited

U.S. PATENT DOCUMENTS

| 7,441,204 | B2 | 10/2008 | Thomson et al. |
| 7,577,923 | B2 | 8/2009 | Beam |
| 7,730,422 | B2 | 6/2010 | Russo |
| 9,628,709 | B2 * | 4/2017 | Semenov ................. G06T 3/20 |
| 9,721,375 | B1 | 8/2017 | Rivard et al. |
| 9,749,549 | B2 | 8/2017 | Shroff |

(Continued)

FOREIGN PATENT DOCUMENTS

| EP | 3700193 B1 | 1/2023 |
| JP | 10-224820 A | 8/1998 |

(Continued)

OTHER PUBLICATIONS

Extended European Search Report from European Patent Application No. 24205908.7 dated Feb. 27, 2025.

(Continued)

*Primary Examiner* — Hung H Lam
(74) *Attorney, Agent, or Firm* — Perkins Coie LLP

(57) ABSTRACT

An image sensor apparatus, comprising a plurality of image sensors organized into a plurality of portions, wherein the plurality of portions comprises a first portion, a second portion and a third portion configured to capture, in combination with each other, an image in a landscape format, a fourth portion and a fifth portion configured to capture, in combination with the first portion, an image in a portrait format.

21 Claims, 20 Drawing Sheets

(56) References Cited

U.S. PATENT DOCUMENTS

| | | |
|---|---|---|
| 10,225,445 B2 | 3/2019 | Lautenbach |
| 11,270,464 B2 | 3/2022 | Cutler |
| 11,297,260 B1 | 4/2022 | Siu |
| 11,497,382 B1 | 11/2022 | Ikuta et al. |
| 11,818,472 B2 | 11/2023 | Siu |
| 12,039,690 B2 * | 7/2024 | Rappaport ............... G06T 3/10 |
| 12,058,451 B2 | 8/2024 | Siu |
| 2006/0146059 A1 | 7/2006 | Inoue et al. |
| 2011/0204461 A1* | 8/2011 | Lee ....................... H04N 25/76 257/E31.127 |
| 2013/0258044 A1 | 10/2013 | Betts-lacroix |
| 2014/0320715 A1 | 10/2014 | Haji-khamneh et al. |
| 2015/0256734 A1* | 9/2015 | Fukuhara ............ H04N 23/741 348/294 |
| 2017/0035293 A1 | 2/2017 | Nistico et al. |
| 2017/0187933 A1 | 6/2017 | Duparre |
| 2017/0363949 A1 | 12/2017 | Valente et al. |
| 2020/0045214 A1 | 2/2020 | Zhou et al. |
| 2020/0128201 A1 | 4/2020 | Glimm |
| 2021/0195118 A1* | 6/2021 | Mustapha ........... H04N 5/2628 |
| 2021/0267695 A1 | 9/2021 | Hazelton et al. |
| 2022/0279131 A1 | 9/2022 | Gong et al. |
| 2023/0247311 A1 | 8/2023 | Siu |
| 2024/0080578 A1 | 3/2024 | Siu |
| 2024/0406581 A1 | 12/2024 | Siu |

FOREIGN PATENT DOCUMENTS

| | | |
|---|---|---|
| JP | 2006-050475 A | 2/2006 |
| JP | 2008099870 A | 4/2008 |
| JP | 2009-027242 A | 2/2009 |
| JP | 2010141375 A | 6/2010 |
| JP | 2013118518 A | 6/2013 |
| JP | 5710274 B2 | 3/2015 |
| JP | 2015105995 A | 6/2015 |
| WO | 2018088121 A1 | 5/2018 |

OTHER PUBLICATIONS

International Search Report and Written Opinion mailed Jun. 27, 2023 for International Patent Application No. PCT/US23/61165.

Notification of Reasons for Refusal for Korean Patent Application No. 10-2024-7025689 mailed Jun. 5, 2025 with English summary, 10 pages.

Office Action from Japanese Patent Application No. 2024-180489 mailed Oct. 14, 2025 (10 pages with English machine translation).

* cited by examiner

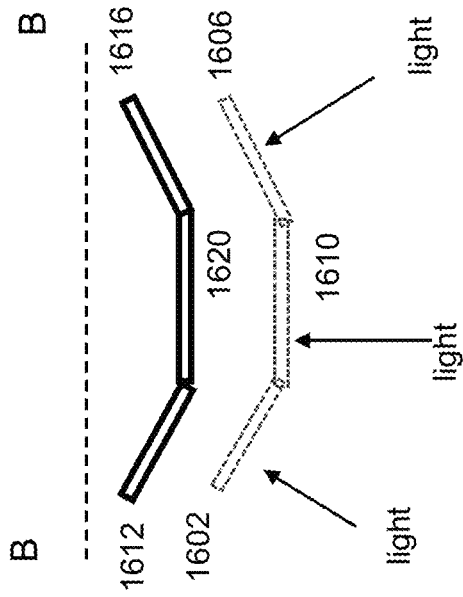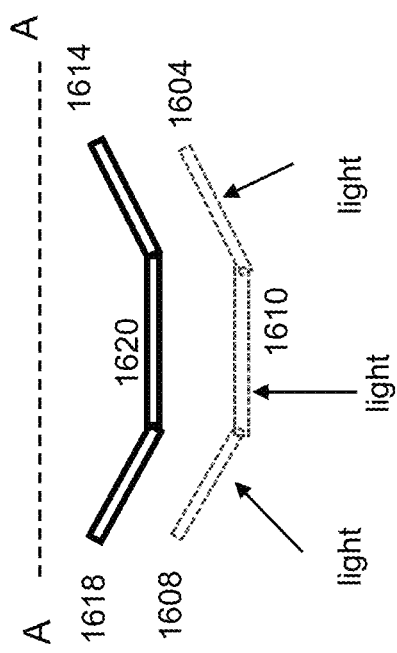
FIG. 18

SIMULTANEOUSLY CAPTURING IMAGES IN LANDSCAPE AND PORTRAIT MODES WITH MOVABLE LANDSCAPE AND PORTRAIT FRAMES, AND ADJUSTABLE ASPECT RATIOS

PRIORITY CLAIM

The present document claims the benefit of priority of, and is a continuation-in-part of U.S. patent application Ser. No. 18/506,865, entitled "Simultaneously capturing images in landscape and portrait modes," having a filing date of Nov. 10, 2023, which is a continuation of U.S. patent application Ser. No. 17/822,658, filed Aug. 26, 2022, now U.S. Pat. No. 11,818,472, issued Nov. 14, 2023, which claims the benefit of priority to U.S. Provisional Patent Application No. 63/267,360, filed Jan. 31, 2022. The entire contents of the above-noted applications are incorporated by reference as part of the disclosure of this document.

TECHNICAL FIELD

The present document relates to image and video capture technologies using a handheld electronic device with a camera

BACKGROUND

Nowadays, most handheld computing devices come equipped with a camera. Users use these devices for capturing video and images

SUMMARY

This document discloses techniques capturing video and images simultaneously in landscape and portrait mode using a camera.

In an example aspect, a video capture device is disclosed. The video capture device includes a plurality of image sensors organized into a plurality of portions, wherein the plurality of portions comprise a first portion, a second portion and a third portion configured to capture, in combination with each other, an image in a landscape format, a fourth portion and a fifth portion configured to capture, in combination with the first portion, an image in a portrait format.

In another example aspect, a video capture device that includes one or more processors is disclosed. a plurality of sensors that includes non-overlapping portions including: a first portion; a second portion; a third portion; a fourth portion; a fifth portion; a processor coupled to the second portion, the third portion, the fourth portion and the fifth portion, wherein the processor is configured to: determine an orientation of the image sensor apparatus, and perform a selective disabling operation based on the orientation such that: in case that the orientation is a portrait format, a first subset of sensors is disabled; and in case that the orientation is a landscape format, a second subset of sensors is disabled, where the second subset of sensor arrays in different from the first subset of sensor arrays.

In yet another aspect, an image sensor apparatus includes a plurality of image sensors organized into a plurality of portions, wherein the plurality of portions comprise: a first portion, a second portion and a third portion configured to capture, in combination with each other, an image in a landscape format, a fourth portion and a fifth portion configured to capture, in combination with the first portion, an image in a portrait format.

In yet another aspect, an image sensor apparatus is disclosed to include: a plurality of sensors that includes non-overlapping portions including: a first portion; a second portion; a third portion; a fourth portion; a fifth portion; a processor coupled to the second portion, the third portion, the fourth portion and the fifth portion, wherein the processor is configured to: determining an orientation of the image sensor apparatus, and performing a selective disabling operation based on the orientation such that in case that the orientation is a portrait format, a first subset of sensors is disabled; and in case that the orientation is a landscape format, a second subset of sensors is disabled, where the second subset of sensors in different from the first subset of sensors.

In yet another aspect, an image capture system is disclosed to include a plurality of sensor arrays comprising: a first sensor array and a second sensor array that are configured to store portions of an image captured in a landscape format; a third sensor array and a fourth sensor array that are configured to store portions of an image captured in a portrait format; a fifth sensor array configured to store a portion of the image captured in the landscape format and a portion of the image captured in the portrait format; and a plurality of lenses comprising: a first lens disposed to cause incident light to fall upon the first sensor array; a second lens disposed to cause the incident light to fall upon the second sensor array; a third lens disposed to cause the incident light to fall upon the third sensor array; a fourth lens disposed to cause the incident light to fall upon the fourth sensor array; a fifth lens disposed to cause the incident light to fall upon the fifth sensor array.

In yet another aspect, a method of operating the above-described algorithm is disclosed.

In yet another aspect, a computer-readable storage medium is disclosed. The storage medium stores code that, upon execution by one or more processors, causes the one or more processor to implement a method described herein.

These, and other, features are described in this document

BRIEF DESCRIPTION OF THE DRAWINGS

FIG. 18 shows example side views of a wide capture angle multi-lens camera configuration

DETAILED DESCRIPTION

Section headings are used in the present document, including the appendices, to improve readability of the description and do not in any way limit the discussion to the respective sections only. Furthermore, throughout this document, the term video is used for compactness, and it will be understood that the described techniques are applicable to capture and storage of both video (a sequence of pictures) or a single picture or an image or a photo. Furthermore, for ease of description, the term "phone" "mobile phone" or "cellphone" is used to describe a variety of different handheld devices that include a camera. Such devices include handheld tablets, pads, laptops, electronic book readers, and so on.

Figure 1:
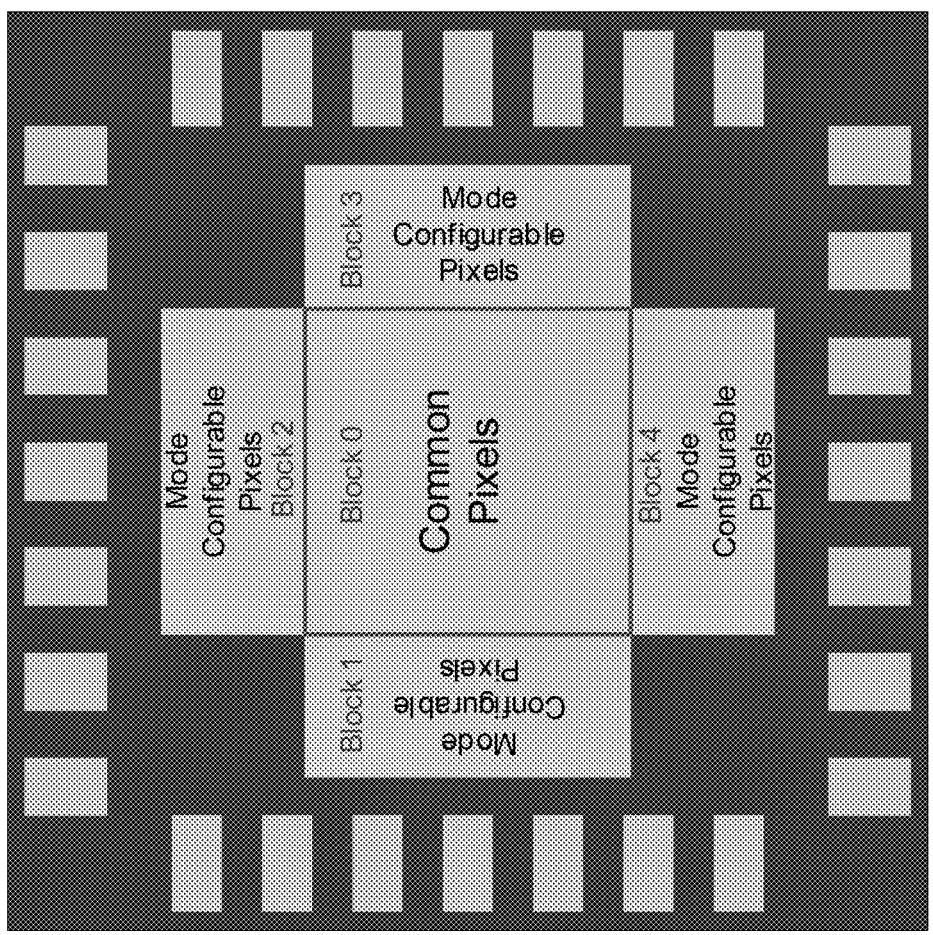
FIG. 1 shows an example of a single camera integrated circuit.
Figure 2:
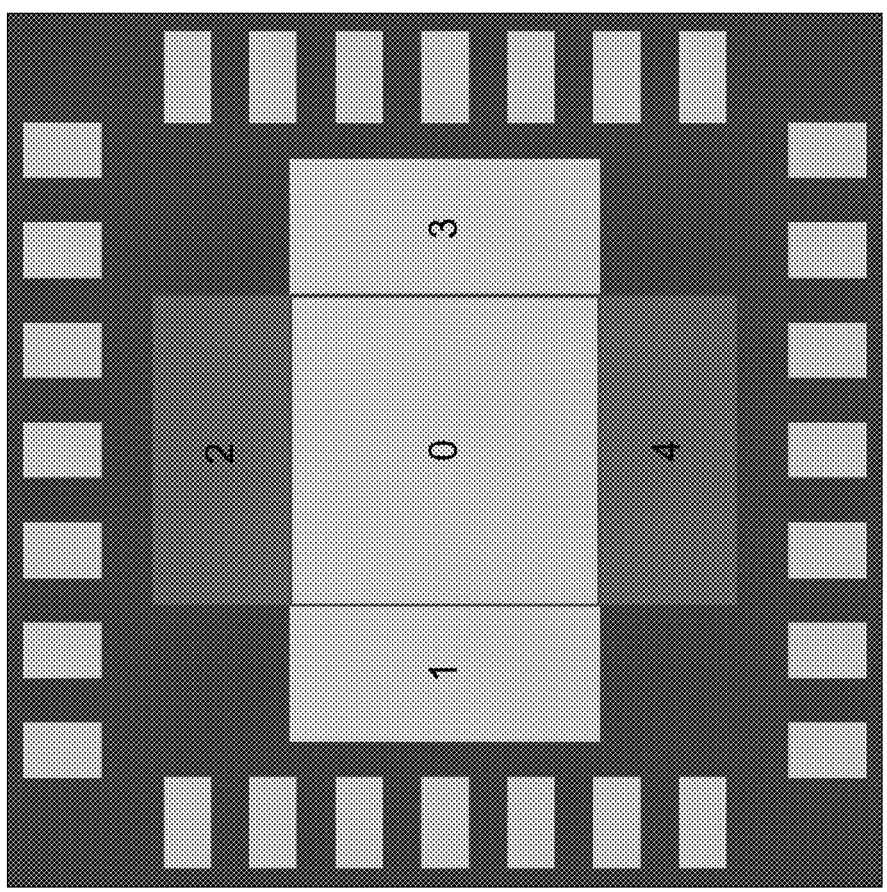
FIG. 2 shows an example of a sensor circuit configured in a landscape format.
Figure 3:
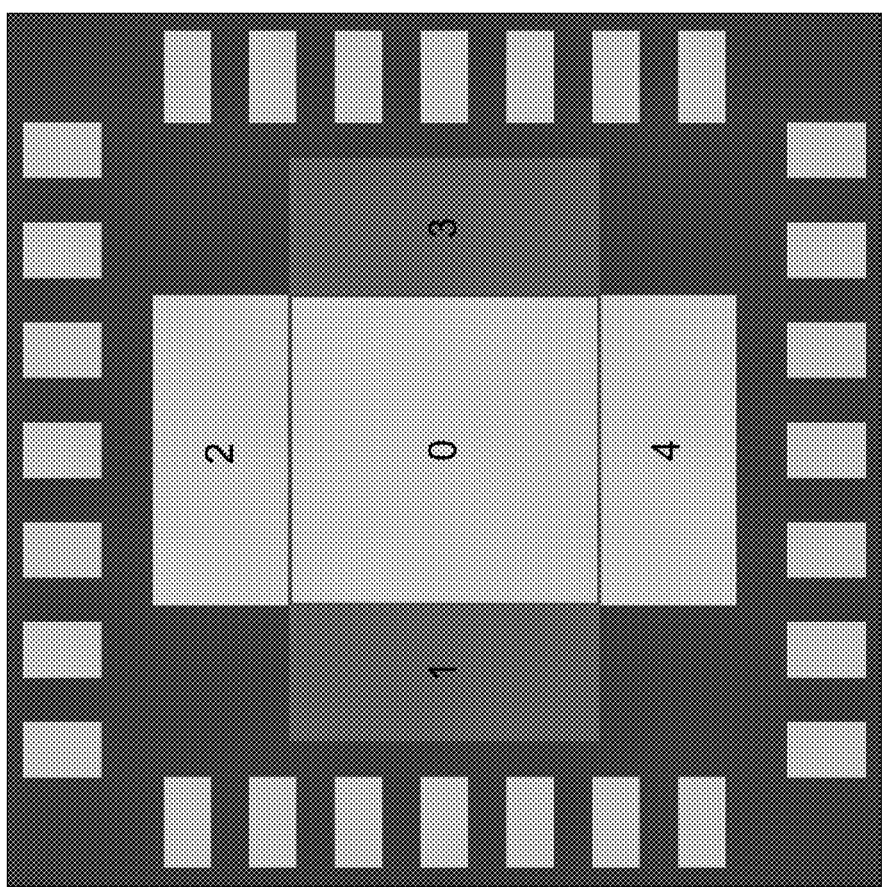
FIG. 3 shows an example of a sensor circuit configured in a portrait format.

The capturing of video/photo in landscape, portrait format separately or both formats simultaneously can be accomplished using one integrated circuit with a cross pattern image sensor (FIG. 1) that has pixels organized in 5 blocks, 0, 1, 2, 3 and 4. Block 0 is common, and is combined with blocks 1, 3 or with blocks 2, 4 for configuring the sensor as landscape or portrait format (FIGS. 2 & 3). The mode configurable pixel blocks 1 and 3, controlled by the processor in a default capture mode or by user selection, are mapped and joined with the common pixel block 0 to form a landscape image. Similarly, common pixel block 0 and mode configurable pixel blocks 2 and 4 are mapped and joined to form a portrait image.

In some embodiments, the image sensor is fabricated as a cross pattern. All pixels are X-Y addressable. The image sensor is a two-dimensional array of pixels. Each pixel has its own intensity value, a location address represented by X (row number) and Y (column number).

The pixel blocks 1, 2, 3 and 4, on command by the processor, are re-mapped, and re-configured to output an image that matches the format (landscape or portrait) selected by the user or by default.

The followings are 2 handheld orientations, each with 2 capture modes.

Figure 4:
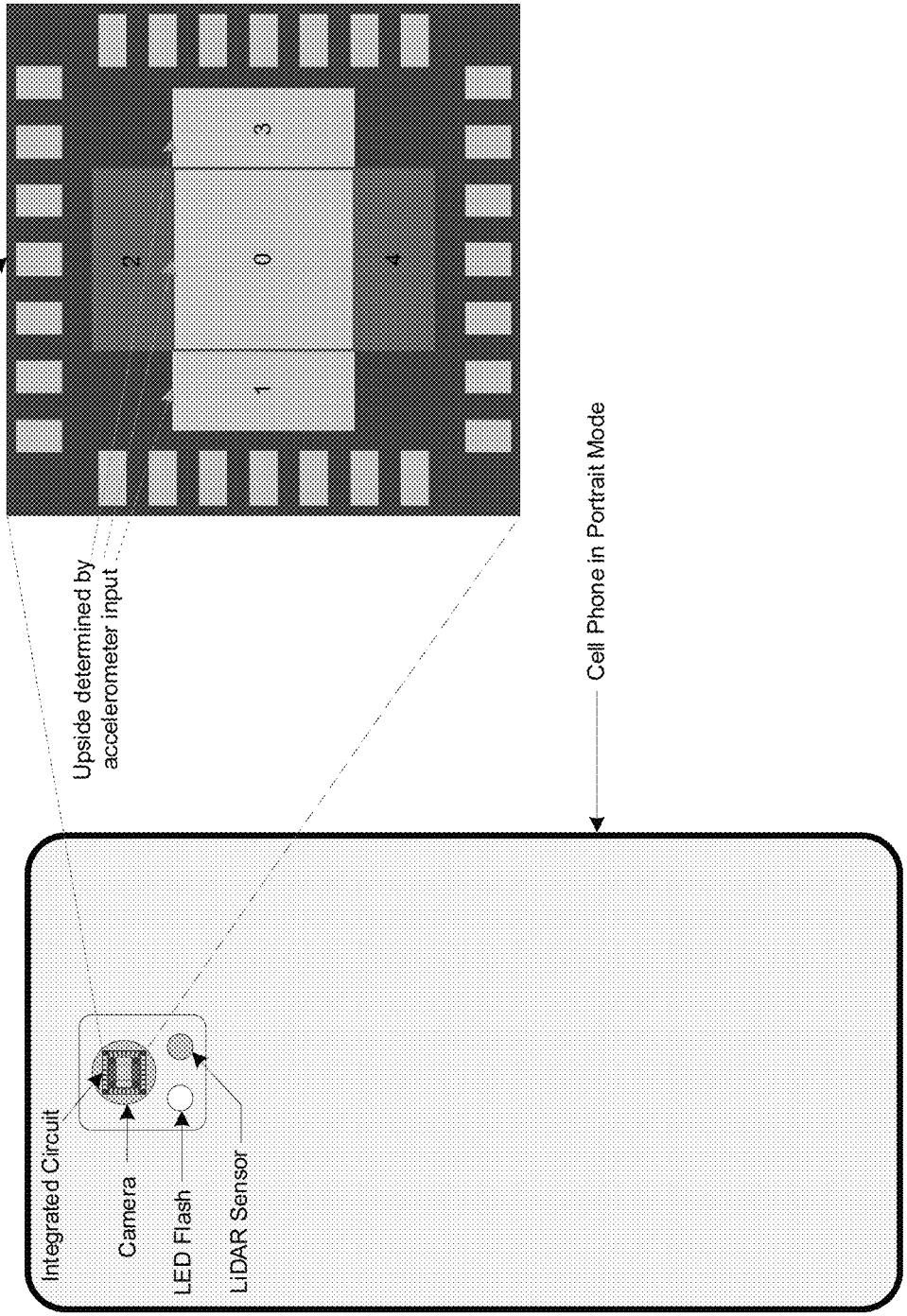
FIG. 4 shows an example of portrait mode operation of a camera.

1. If the default capture mode is landscape, the cellphone, held in portrait orientation, has its forward-facing camera with pixel blocks 1, 3 enabled and blocks 2, 4 disabled (FIG. 4). Note that block 0 is on when the camera is turned on. The upside (which side is up direction) of blocks 1, 0 and 3 are determined by an input from the accelerometer.

While the cellphone is held in portrait orientation and the capture mode is changed from landscape to portrait via onscreen touch selection. The forward-facing camera has pixel blocks 2, 4 enabled and blocks 1, 3 disabled.

Figure 5:
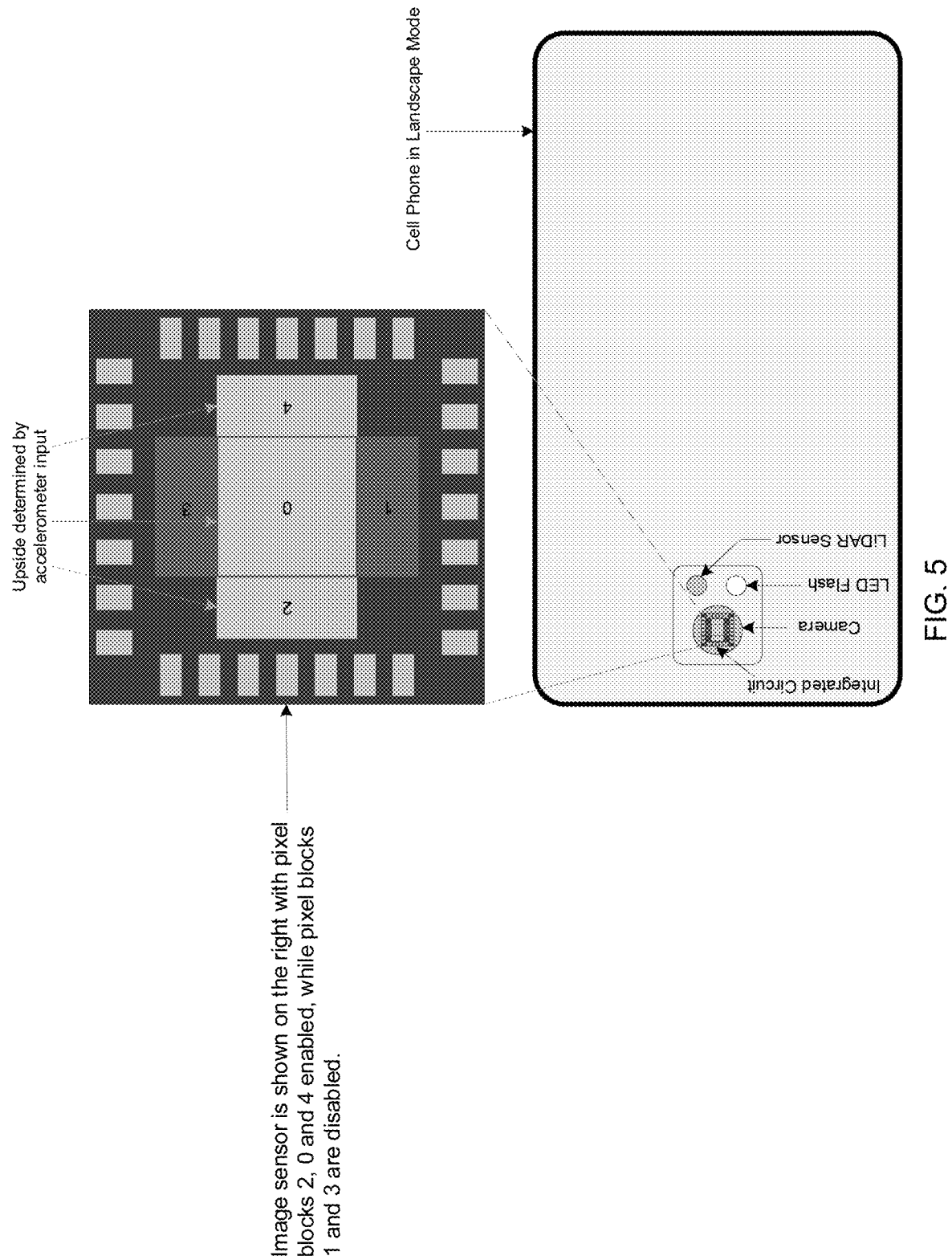
FIG. 5 shows an example of a landscape mode operation of a camera.

2. If the default capture mode is landscape, the cellphone, held in landscape orientation, has its forward-facing camera with pixel blocks 2, 4 enabled and blocks 1, 3 disabled (FIG. 5). Note that block 0 is on when the camera is turned on. The upside of blocks 2, 0 and 4 are determined by an input from the accelerometer.

While the cellphone is held in landscape orientation and the capture mode is changed from landscape to portrait via onscreen touch selection. The forward-facing camera has pixel blocks 1, 3 enabled and blocks 2, 4 disabled.

3. If the default capture mode is portrait, the cellphone, held in portrait orientation, has its forward-facing camera with pixel blocks 2, 4 enabled and blocks 1, 3 disabled.

While the cellphone is held in portrait orientation and the capture mode is changed from portrait to landscape via onscreen touch selection. The forward-facing camera has pixel blocks 1, 3 enabled and blocks 2, 4 disabled.

4. If the default capture mode is portrait, the cellphone, held in landscape orientation, has its forward-facing camera with pixel blocks 1, 3 enabled and blocks 2, 4 disabled.

While the cellphone is held in landscape orientation and the capture mode is changed from portrait to landscape via onscreen touch selection. The forward-facing camera has pixel blocks 2, 4 enabled and blocks 1, 3 disabled.

The followings are 2 handheld orientations, each with all 5 pixel blocks 0, 1, 2, 3, 4 simultaneously turned on for the simultaneous capture of landscape and portrait video/photo.

1. When the cellphone is held in portrait orientation, the video or photo is captured with all 5 pixel blocks enabled. For the photo session, the processor commands the integrated circuit to output 2 images, landscape and portrait, with the upside of all 5 pixel blocks determined by the accelerometer. In this case, the landscape photo is created by joining pixel blocks 1, 0, 3, and the portrait photo is created by joining pixel blocks 2, 0, 4. After capturing, the user can choose either format, landscape or portrait, to display onscreen.

For the video session, the processor commands the integrated circuit to output 2 separate video files, a landscape mode file and a portrait mode file, for display and storage. In this case, the landscape video is created by joining pixel blocks 1, 0, 3, and the portrait video is created by joining pixel blocks 2, 0, 4. For displaying while recording, the user can choose to display onscreen either landscape video or portrait video, and for playback, the user can choose either format for playback.

2. When the cellphone is held in landscape orientation, the video or photo is captured with all 5 pixel blocks enabled. For the photo session, the processor commands the integrated circuit to output 2 images, landscape and portrait, with the upside of all 5 pixel blocks determined by the accelerometer. In this case, the landscape photo is created by joining pixel blocks 2, 0, 4, and the portrait photo is created by joining pixel blocks 3, 0, 1. After capturing, the user can choose either format, landscape or portrait, to display onscreen.

For the video session, the processor commands the integrated circuit to output 2 separate video files, a landscape mode file and a portrait mode file, for display and storage. In this case, the landscape video is created by joining pixel blocks 2, 0, 4, and the portrait video is created by joining pixel blocks 3, 0, 1. For displaying while recording, the user can choose to display onscreen either landscape video or portrait video, and for playback, the user can choose either format for playback.

During simultaneous capturing session, the user can select, via onscreen touch icon, a display preview in either landscape or portrait format prior to capturing. The integrated circuit not only serves as the image sensor, but also serves as the media processor that provides simultaneous streaming of landscape and portrait video.

Figure 6:
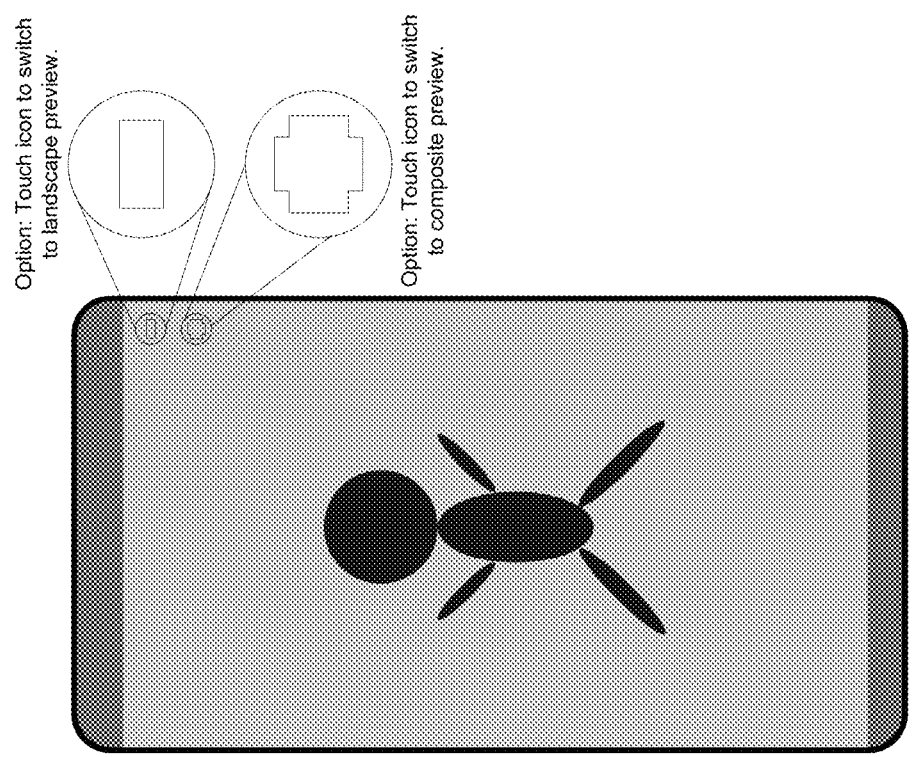
FIG. 6 shows an example of portrait mode preview generation.
Figure 7:
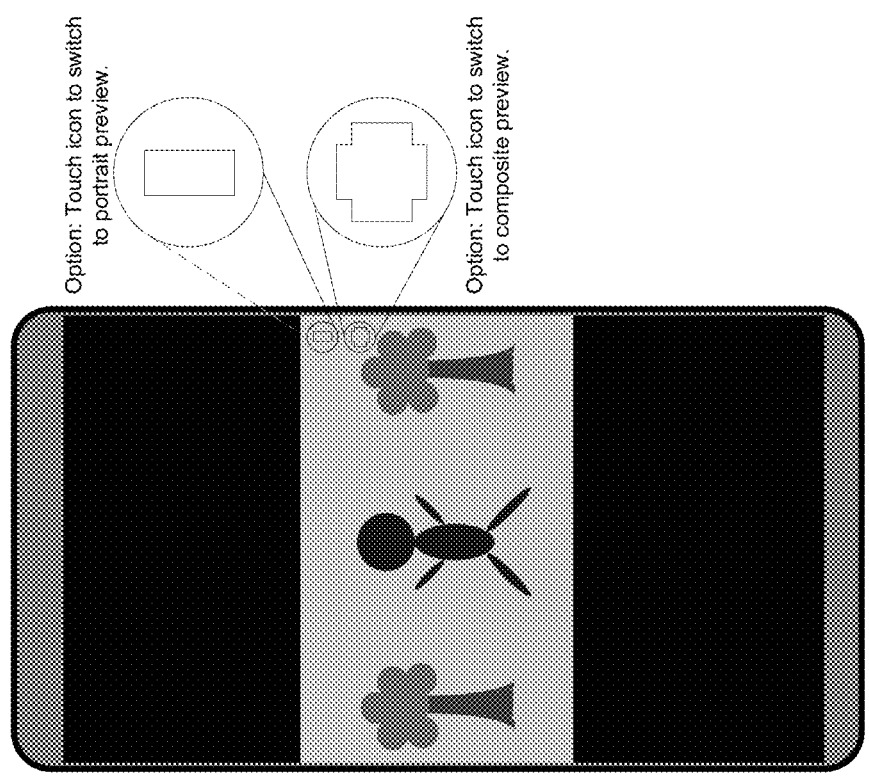
FIG. 7 shows an example of a landscape mode preview generation.
Figure 8:
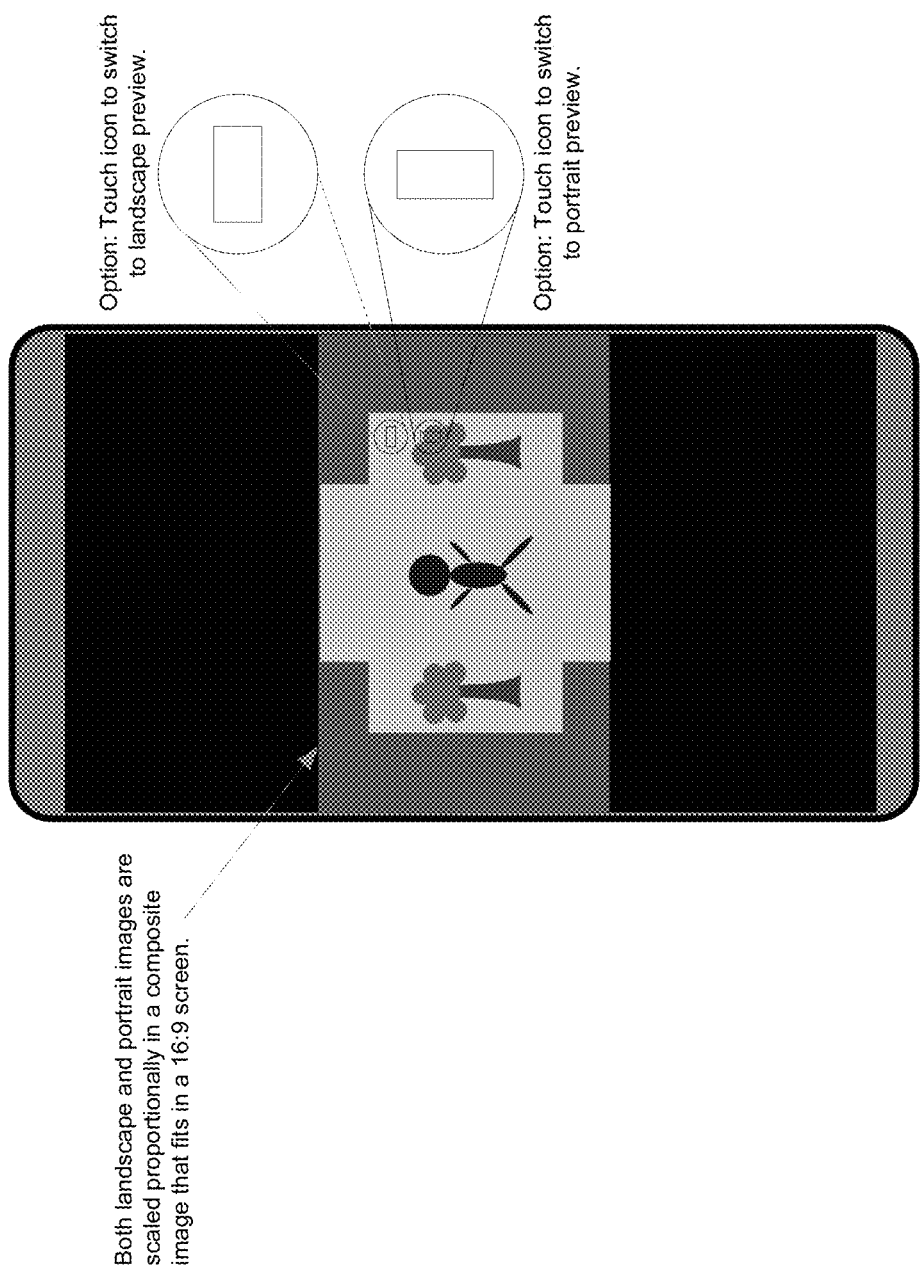
FIG. 8 shows an example of a 16:9 preview generation.

The sensor/media processor, prior to capturing, can generate a portrait preview (FIG. 6), a landscape preview (FIG. 7), or a composite preview of both landscape and portrait images by proportional scaling both images to fit in a screen of a given aspect ratio, for example, a 16:9 aspect ratio (FIG. 8). In each preview screen, there are 2 icons for the user to select the other two preview screens. In an alternate method, only one icon is used for preview selection, the first touch selects the second preview, the second touch selects the third preview, and the third touch rotates back to the first preview.

In some embodiments, to provide the functionality of 3D video/photo capture, two cameras are mounted, one on the top left corner and the other on the top right corner, to emulate the binocular vision that yields the 3D perception.

Because the disclosed combined integrated image sensor and media processor is distinguishable from convention image sensor only device, the Landscape and Portrait Sensor may be called LandPortSensor or LPSensor for short.

There are many types of LiDAR sensors (Light Detection and Ranging), and selecting the right one is important for a successful application. A LiDAR sensor is mounted near the camera, when activated, a light pulse is emitted light towards a distant subject. How long it takes for the reflected light to return to the sensor is used to determine the distance from the camera to the subject. Since all 5 pixel blocks are independently controlled, each pixel block can be turned on separately, and to capture image one at a time with distance measurement stored in metadata or displayed onscreen. This is a useful feature for investigative work or for other special interest activity.

With the LPSensor installed in the professional camera. It is no longer necessary for the photographer to tilt his camera in order to capture the portrait image. Since both formats can be previewed simultaneously or separately, he can capture either format separately or both formats simultaneously. It helps increase productivity.

Figure 9A:
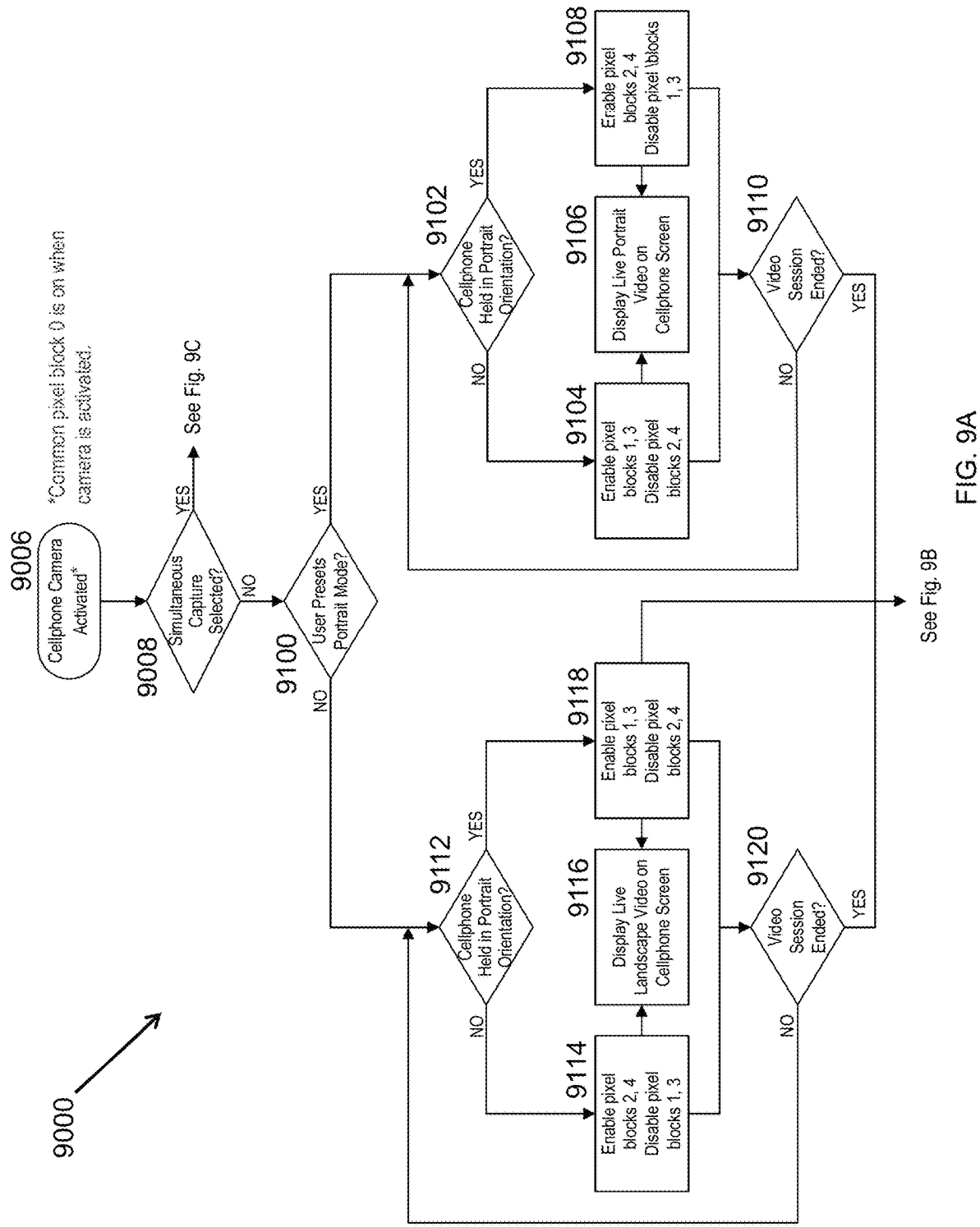
FIGS. 9A-9C show a flowchart of camera operation method examples.
Figure 9B:
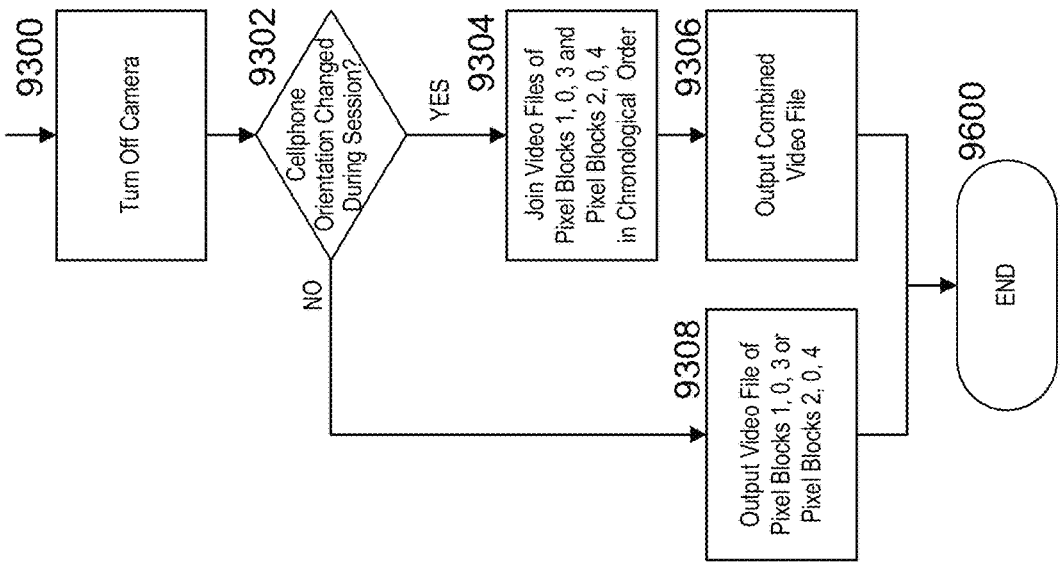
Figure 9C:
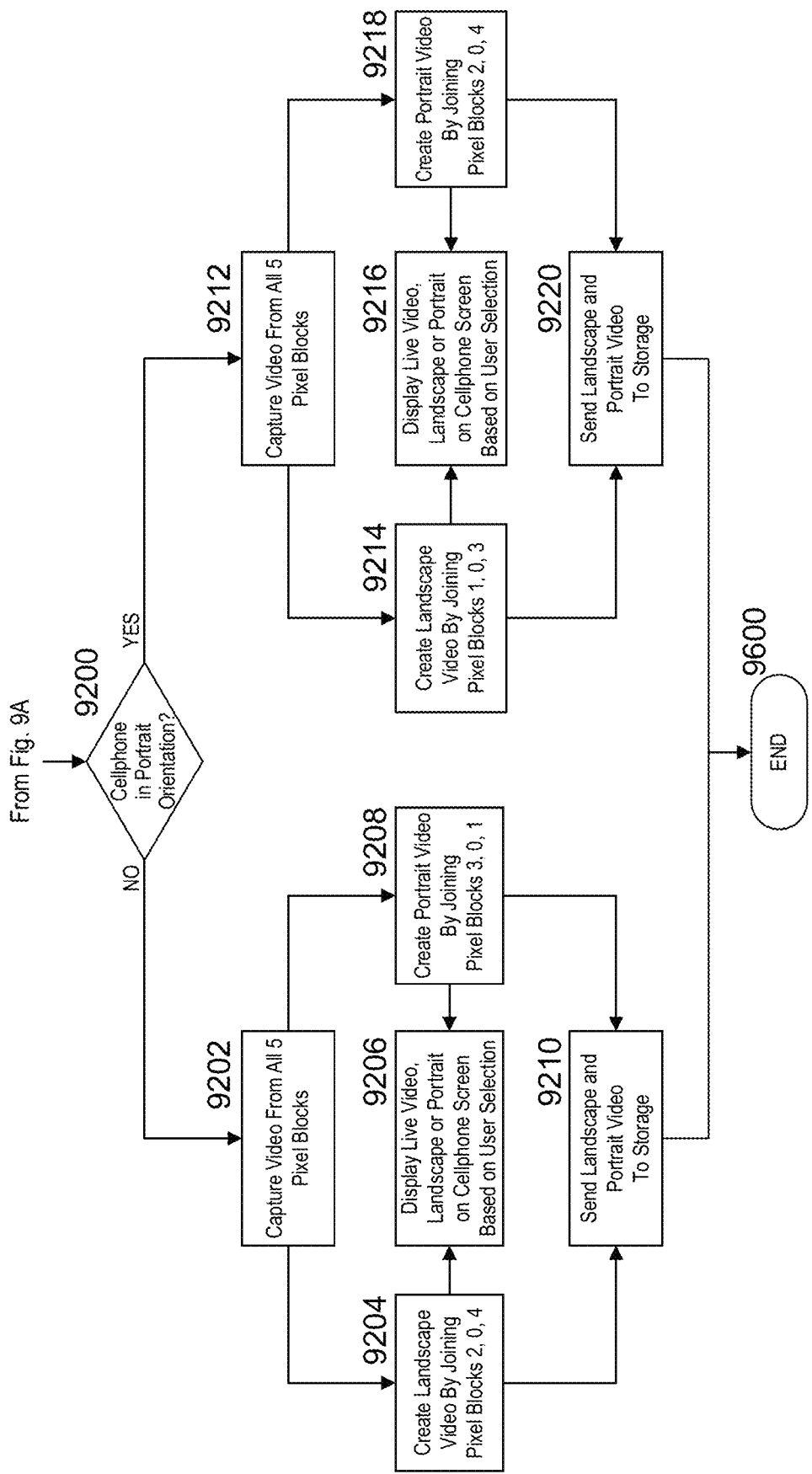
Figure 10:
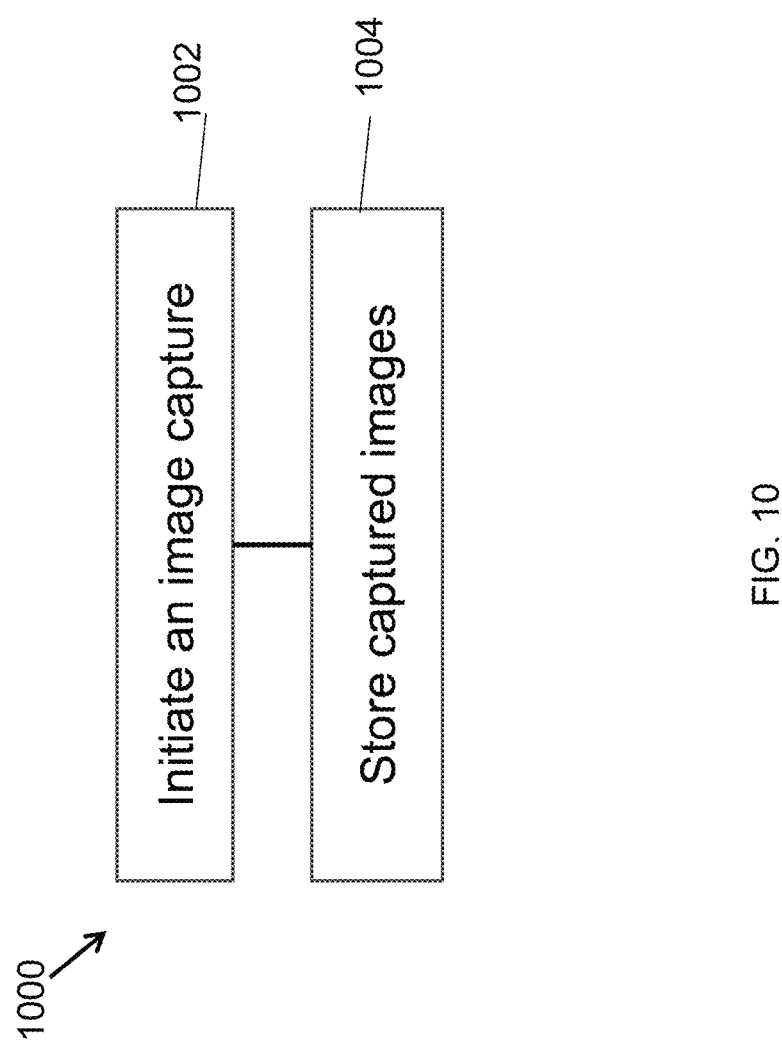
FIG. 10 shows a flowchart of an example method of operating a video capture device.

FIG. 9A, FIG. 9B and FIG. 9C together are the flowcharts illustrating a general method 9000 for a cellphone to capture images or videos. Method 9000 begins at starting block 9006, activating the camera. At step 9008, the cellphone determines if a simultaneous capture mode is selected. If the simultaneous capture mode is not selected, method 9000 continues to step 9100 in FIG. 9A. If the simultaneous capture mode is selected, method 9000 continues to step 9200 in FIG. 9B.

At step 9100, method 9000 determines if the user presets the portrait mode as capturing mode. If the portrait mode is already the preset mode, then at step 9102, the cellphone determines if the orientation of the cellphone is portrait. If the cellphone is in portrait orientation, the cellphone enables pixel bocks 2 and 4, but disables pixel blocks 1 and 3 (9108). However, if the cellphone is in landscape orientation, the cellphone enables pixel blocks 1 and 3, but disables pixel blocks 2 and 4 (9104). After enabling and disabling certain pixel blocks at steps 9108 or 9104, the cellphone screen displays the portrait live view (9106). At step 9110, if a video session is not ended, method 9000 continues back to step 9102 to determine if the cellphone is held in portrait orientation.

At step 9100, method 9000 determines if the user presets the portrait mode as capturing mode. If the portrait mode is not already the preset mode, then at step 9112, the cellphone determines if the orientation of the cellphone is portrait. If the cellphone is in portrait orientation, the cellphone enables pixel bocks 1 and 3, but disables pixel blocks 2 and 4 (9118). However, if the cellphone is in landscape orientation, the cellphone enables pixel blocks 2 and 4, but disables pixel blocks 1 and 3 (9114). After enabling and disabling certain pixel blocks at steps 9118 or 9114, the cellphone screen displays the portrait live view (9116). At step 9120, if the video session has not ended, method 9000 continues back to step 9112 to determine if the cellphone is held in portrait orientation.

When method 9000 determines that the video session has ended at either step 9110 or 9120, it turns off the camera at step 9300 (see FIG. 9C). Then at step 9302, method 9000 determines if the cellphone orientation has changed during the session. If the orientation has not changed during the session, at step 9308, method 9000 outputs either a video file of pixel blocks 1, 0, and 3, or a video file of pixel blocks 2, 0, and 4. If the orientation has changed, at step 9304, method 9000 joins video files of pixel blocks 1, 0, and 3; method 9000 further joins video files of pixel blocks 2, 0, and 4. At step 9304, method 9000 joins files in chronological order. At step 9306, method 9000 outputs a combined video file. At step 9600, the non-simultaneous capture mode stops.

At step 9008, method 9000 continues to step 9200 after determining the cellphone is in the simultaneous capture mode. At step 9200, method 9000 determines if the cellphone is in the portrait orientation. If the cellphone is at portrait orientation, at step 9212, method 9000 captures a video from all 5 pixel blocks. Then at step 9214, method 9000 creates a landscape video by joining pixel blocks 1, 0, and 3. At step 9218, method 9000 creates a portrait video by joining pixel blocks 2, 0, and 4. After steps 9214 and 9218, method 9000 continues to step 9216. At step 9220, method 9000 sends landscape and portrait videos to storage.

Again, at step 9200, method 9000 determines if the cellphone is in the portrait orientation. If the cellphone is not at portrait orientation, at step 9202, method 9000 captures a video from all 5 pixel blocks. Then at step 9204, method 9000 creates a landscape video by joining pixel blocks 2, 0, and 4. At step 9208, method 9000 creates a portrait video by joining pixel blocks 3, 0, and 1. After steps 9204 and 9208, method 9000 continues to step 9206. At step 9210, method 9000 sends landscape and portrait videos to storage. At step 9600, the simultaneous capture mode stops.

With respect to FIGS. 9A to 9C and FIG. 10, prior to image/video capture, the image capture device might provide a preview of both the landscape and the portrait mode on the user interface in a composite format (e.g., display that looks like "+" sign). In one operational mode, the user may be able to simultaneously capture to composite format and play back video in portrait-only, landscape-only or composite format.

In some embodiments, the image sensor has 5 separate pixel blocks arranged in a cross pattern. The center block (block 0) may be laid on a horizontal plane, while the other 4 blocks may be laid on tilted planes. The corresponding image capture device may have 5 separate lenses. Each lens may be non-coplanar with respect to the other lenses. Each lens is configured to focus light directly onto each respective pixel block. In one case, the planes of blocks 1 and 3 may be tilted down at an equal angle or at an unequal angle for wide angle panoramic image capture, while the planes of blocks 2 and 4 may be tilted up at an equal angle or at an unequal angle for narrow angle image capture. In another case, all 4 blocks, 1, 2, 3 and 4 may be tilted down or up.

In order for the image sensor to capture a complete image, each pixel block will be associated with a corresponding lens to focus light onto it. This is because the tilted planes of the pixel blocks mean that light from the scene will not be evenly distributed across the sensor. If only one lens were used, some of the pixel blocks would receive too much light, while others would receive too little light. This would result in an image that is distorted and inaccurate.

For example, the image sensor configuration may be as follows: The image sensor is divided into 5 separate pixel blocks. The blocks are arranged in a cross pattern. The center block is laid on a horizontal plane. The other four blocks are laid on tilted planes.

For example, the camera lens system configuration may be as follows. There are at least 5 separate lenses, each corresponding to one of the pixel blocks on the sensor. Each lens focuses light directly onto its respective pixel block.

The above-described multi-camera lens systems are designed to capture information from multiple perspectives simultaneously, potentially enhancing the overall image quality, depth perception, or providing some unique imaging capability. Here are some potential reasons for such a configuration:

Security cameras and Unmanned Airplane (Drone): Multi-camera lens systems can be used to provide a wider field of view than a single camera. This can be helpful for monitoring large areas or for capturing multiple angles of a scene.

Medical imaging: Multi-camera lens systems can be used to create 3D images of the human body. This can be helpful for diagnosing and treating medical conditions.

Robotics: Multi-camera lens systems can be used to give robots a more complete view of their surroundings. This can help them to navigate their environment and to avoid obstacles.

Depth Sensing: The arrangement of tilted pixel blocks could facilitate depth sensing or 3D imaging by capturing different perspectives of the scene.

Panoramic Imaging: The cross pattern arrangement may be used for capturing a wide field of view by combining information from multiple lenses.

Specialized Applications: Depending on the specific requirements of the application, this configuration might be advantageous for certain imaging tasks. It's important to note that such a design may also introduce challenges, such as ensuring accurate alignment of the lenses and maintaining image consistency across the sensor According to various embodiments, the following technical solutions are provided to address various existing technical problems discussed in the present document, among other issues.

A1. An image sensor apparatus (FIG. 15), comprising: a first sensor array comprising a first plurality image sensors, a second sensor array comprising a second plurality image sensors; a third sensor array comprising a third plurality image sensors; a fourth sensor array comprising a fourth plurality image sensors; a fifth sensor array comprising a fifth plurality image sensors; wherein the second sensor array and the fourth sensor array are configured to be excluded from use for capturing images in a portrait format; wherein the third sensor array and the fifth sensor array are configured to be excluded from use for capturing images in a landscape format; and wherein the first sensor array is configured to be used for capturing images in the portrait format and the landscape format.

A2. The apparatus of solution A1, wherein the first sensor array is a rectangular array having a height of H pixels and a width of W pixels, and wherein the second sensor array and the fourth sensor array have heights of H pixels and the third sensor array and the fifth sensor arrays have widths of W pixels.

A3. The apparatus of solution A1, wherein the second sensor array is configured to capture a left-end portion of images in the landscape format and the fourth sensor array is configured to capture a right-end portion of images in the landscape format.

A4. The apparatus of solution A1, wherein the third sensor array is configured to capture a top-end portion of images in the portrait format and the fifth sensor array is configured to capture a bottom-end portion of images in the portrait format.

In various embodiments, the above-disclosed blocks 0 to 4 may be organized in different ways. For example, in some embodiments, blocks 2 and 4 may have identical sizes. In some embodiments, blocks 1 and 3 may have identical sizes. Alternatively blocks 2 and 4 may have different sizes and/or blocks 1 and 3 may have different sizes. This may result in a capture region that is horizontally or vertically asymmetric with respect to the center block 0 of common pixels. The additional pixels to the top (bottom, left or right) may be used to insert metadata or fingerprinting information such as a date stamp or a location identifier that may be, at the option of the user, may be included in the visible image. In some embodiments, the block 0 may be square. In some embodiments, the block 0 may be a rectangle. For example, block 0 may be wider in a horizontal (landscape) direction to provide a wider panoramic picture. In some embodiments, block 0 may be taller in a vertical (portrait) direction to provide a wide height image. In some implementations, blocks 1, 2, 3 and 4 may be used to capture three dimensional information of the captured visual scene. For example, blocks 1 and 3 may hold left-eye, right-eye information of block 0 image.

A5. The apparatus of solution A1, further comprising a media processor, wherein the media processor is electrically connected to the first, second, third, fourth, and fifth sensor arrays.

A6. The apparatus of solution A1, further comprising a handheld structure housing the apparatus.

7. A method of capturing images (e.g., flowchart 1000 FIG. 10), comprising: initiating (1002) a capture of an image or a video capture based on an instruction received on a user interface of a camera that comprises: a first sensor array comprising a first plurality image sensors, a second sensor array comprising a second plurality image sensors; a third sensor array comprising a third plurality image sensors; a fourth sensor array comprising a fourth plurality image sensors; a fifth sensor array comprising a fifth plurality image sensors; wherein the second sensor array and the fourth sensor array are configured to be excluded from use for capturing images in a portrait format; wherein the third sensor array and the fifth sensor array are configured to be excluded from use for capturing images in a landscape format; and wherein the first sensor array is configured to be used for capturing images in the portrait format and the landscape format; and storing (1004) the captured image or the video to three or more of the first to fifth sensor arrays according to the instruction.

A8. The method of solution A7, further comprising: generating one or more previews prior to capturing, including a portrait preview, a landscape preview, or a composite preview; receiving at least one selection from the user interface to select between the portrait preview, the landscape preview, and the composite preview; and displaying the preview on a screen.

A9. The method of solution A7, further comprising generating the composite preview of both landscape and portrait images, and scaling the composite preview to fit in the screen of a given aspect ratio.

A10. The method of solution A7, further comprising: generating, after storing the captured image or video, a first file according to the landscape format and a second file according to the portrait format.

A11. The method of solution A7 further comprising: generating a first file and a second file such that a first portion of the first file is exclusive to the first file; a second portion of the first file is shared with the second file; a portion of the second file is exclusive to the second file; and storing the first file and the second file in a memory.

A12. An image sensor apparatus (e. g., FIGS. 1 to 5 and 11), comprising: a group of sensor arrays that includes non-overlapping sensor arrays including: a first sensor array, a second sensor array; a third sensor array; a fourth sensor array; a fifth sensor array; a processor coupled to the second sensor array, the third sensor array, the fourth sensor array and the fifth sensor array, wherein the processor is configured to: determining an orientation of the image sensor apparatus, and performing a selective disabling operation based on the orientation such that: in case that the orientation is a portrait format, a first subset of sensor arrays from the group of sensor arrays is disabled; and in case that the orientation is a landscape format, the second subset of sensor arrays from the group of sensor arrays is disabled, where the second subset of sensor arrays in different from the first subset of sensor arrays. For example, the processor may be processor 1102 depicted in FIG. 11. One embodiment is depicted in FIGS. 1 to 5, the first sensor array is pixel block 0, the second sensor array is pixel block 1, the third sensor array is pixel block 2, the fourth sensor array is pixel block 3, the fifth sensor array is pixel block 4.

A13. The image sensor apparatus of solution A12, wherein the first subset of sensor arrays comprises the second sensor array and the fourth sensor array.

A14. The image sensor apparatus of solution A12, wherein the second subset of sensor arrays comprises the third sensor array and the fifth sensor array.

A15. The image sensor apparatus of solution A12, wherein the processor is configured to enable the first sensor array in the portrait format and the landscape format.

A16. The image sensor apparatus of solution A12, wherein the first sensor array is a rectangular array having a height of H pixels and a width of W pixels, and wherein the second sensor array and the fourth sensor array have heights of H pixels and the third sensor array and the fifth sensor arrays have widths of W pixels.

A17. The image sensor apparatus of solution A12, wherein the second sensor array is configured to capture a left-end portion of images in the landscape format and the fourth sensor array is configured to capture a right-end portion of images in the landscape format.

A18. The image sensor apparatus of solution A12, wherein the third sensor array is configured to capture a top-end portion of images in the portrait format and the fifth sensor array is configured to capture a bottom-end portion of images in the portrait format.

A19. The image sensor apparatus of solution A12, further comprising a handheld structure housing the image sensor apparatus.

A20. The image sensor apparatus of solution 12, wherein the processor is configured to determine the orientation using an input received at a user interface or using an orientation sensor.

In various embodiments, the above-disclosed arrays 0 to 4 may be organized in different ways. For example, in some embodiments, arrays 2 and 4 may have identical sizes. In some embodiments, arrays 1 and 3 may have identical sizes. Alternatively arrays 2 and 4 may have different sizes and/or arrays 1 and 3 may have different sizes. This may result in a capture region that is horizontally or vertically asymmetric with respect to the center array 0 of common pixels. The additional pixels to the top (bottom, left or right) may be used to insert metadata or fingerprinting information such as a date stamp or a location identifier that may be, at the option of the user, may be included in the visible image. In some embodiments, the array 0 may be square. In some embodiments, the array 0 may be a rectangle. For example, array 0 may be wider in a horizontal (landscape) direction to provide a wider panoramic picture. In some embodiments, array 0 may be taller in a vertical (portrait) direction to provide a wide height image. In some implementations, arrays 1, 2, 3 and 4 may be used to capture three dimensional information of the captured visual scene. For example, arrays 1 and 3 may hold left-eye, right-eye information of array 0 image.

The entire foregoing descriptions also applies to the user-facing camera.

Figure 15:
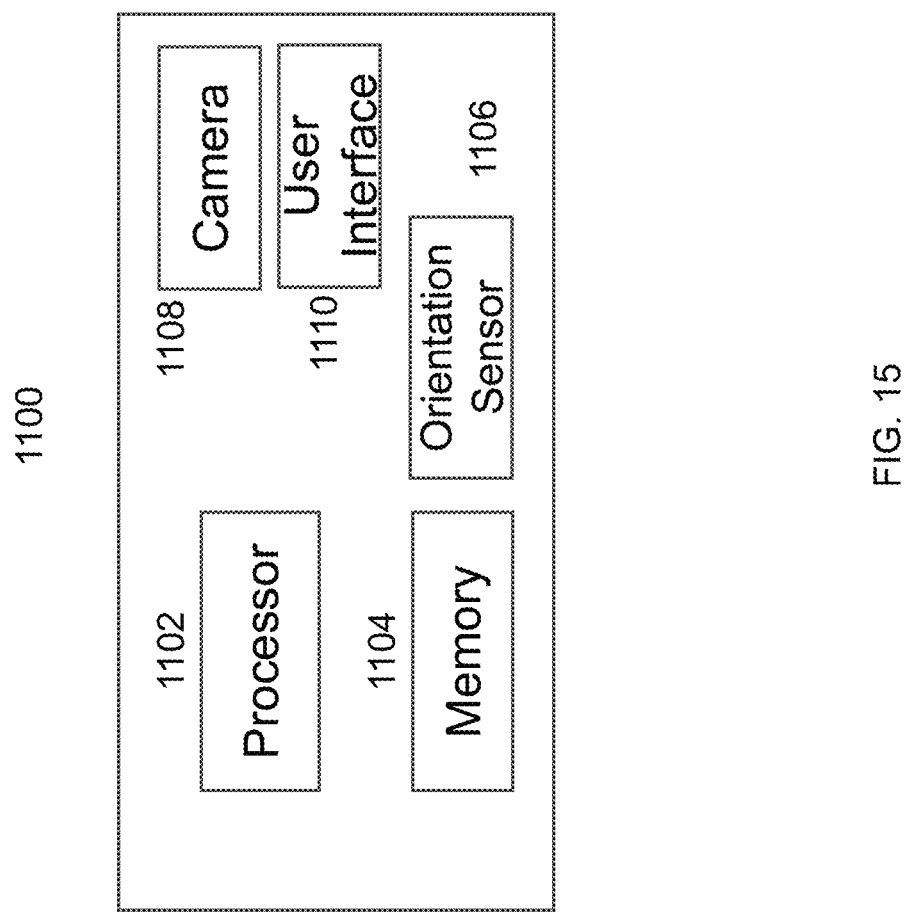
FIG. 15 is a block diagram of a video capture device.

FIG. 15 shows an example video capture device 1100. The device 1100 includes a processor 1102 configured to perform the methods disclosed in the present document. The device 1100 includes a memory that is used for storing processor-executable code and/or image files. The memory may be internal to the processor 1102. The device 1100 includes an orientation sensor that is configured to determine a tilt angle or orientation of the camera (e.g., portrait mode, landscape mode, or something in between). The device 1100 includes a camera that comprises an image sensor as disclosed herein. The device 1100 includes a user interface 1110 that may be configured to receive user inputs (e.g., buttons, touchscreen, etc.) and/or displaying images and interactive menu to the user.

Example Embodiments of Flexible Image Edge Adjustments

As the image sensor technology advances, not only each row and column pixel can be enabled or disabled independently, but also each individual pixel of an image sensor can be enabled or disabled independently. Therefore, it may be possible to create an image sensor with active movable frames of landscape and portrait, and to have the ability to choose presettable aspect ratios or to adjust the aspect ratios prior to capturing images. In most modern image sensors, each individual pixel of an image sensor can be enabled or disabled independently. This level of control is useful for capturing accurate and detailed images, as it allows for precise control over exposure, noise reduction, and other image processing techniques. Since each individual pixel of an image sensor can be enabled or disabled independently, which enables a technique called pixel binning. In pixel binning, multiple pixels are grouped together and their signals are combined to create a single output pixel. This can be done to improve the sensitivity of the image sensor in low light conditions, or to reduce the noise in the image. It may also be used by some of the disclosed techniques of moving the captured landscape and portrait frames, and to adjust the aspect ratios prior to capturing images. The disclosed embodiments allow not only for the user to physically to center the subjects within the frames by moving the camera, but also allows the user to electronically center the subjects within the frames.

The image sensor/processor (or one or more processors) allows the user to center the subjects within a landscape frame and a portrait frame; to select the presettable aspect ratios of landscape and portrait or to adjust the aspect ratios of landscape and portrait; prior to simultaneously capturing both landscape and portrait images or simultaneously capturing both landscape and portrait videos. Alternatively, or in addition, a machine learning algorithm may be implemented on the processor(s) to detect objects in view of the image sensors, make a determination about orientation of the objects, based on the object orientation, detect whether landscape mode is suitable or portrait mode is suitable, setting the correct capture orientation mode based on the detection and/or move the left/right or top/bottom boundaries of the image being capture automatically such that the objects are captured in the active capture area of the image capture device.

Refer to FIGS. 11, 12, 13 and 14, the user, operating the camera, decides to center the subjects within the frames. The operation requires that the entire length of 2 edges per frame, indicated by 6 bi-directional vertical arrows, 3 each per edge, of landscape (formed by blocks 1, 0 and 3) be moved up or down. Similarly, 3 horizontal arrows indicative of edges of portrait be moved left or right (initially defined by blocks 0, 2 and 4) in, possibly equal, number of row pixels and column pixels respectively, the captured landscape frame is then moved vertically up or down, and/or the captured portrait frame is then moved horizontally left or right. For example, in capturing landscape image, if the user decides to move 10 rows of pixel toward the up direction, then 10 rows of pixels in the up direction will be activated or enabled, while 10 rows of pixel in the down direction will be de-activated or disabled. Similarly, in capturing portrait image, if the user decides to move 10 columns of pixel toward the right direction, then 10 columns of pixels in the right direction will be activated or enabled, while 10 columns of pixel in the left direction will be de-activated or disabled. Alternatively, or in addition, the horizontal or vertical movement of pixel locations may be performed automatically by a processor-implemented algorithm on a processor of the camera.

In some embodiments, after centering the subjects within the landscape frame and the portrait frame, the user proceeds to select the presettable aspect ratios of landscape and portrait from a number of presettable landscape and portrait aspect ratios or to adjust the aspect ratios of landscape and portrait by moving the entire length of an upper edge or a lower edge vertically up or down for landscape frame or by moving the entire length of a left edge or a right edge horizontally left or right for portrait frame.

Alternately, the user can choose to operate, as described in the preceding 2 paragraphs, in reverse order. That is setting the aspect ratios first, then moving the captured frames.

If the user moves the top and bottom edges of the captured landscape frame to cover the entire image sensor, he will capture a single image utilizing the total image sensor area. This is the same as if the user moves the left and right edges of the captured portrait frame to cover the entire image sensor, he will capture a single image utilizing the total image sensor area.

Figure 11:
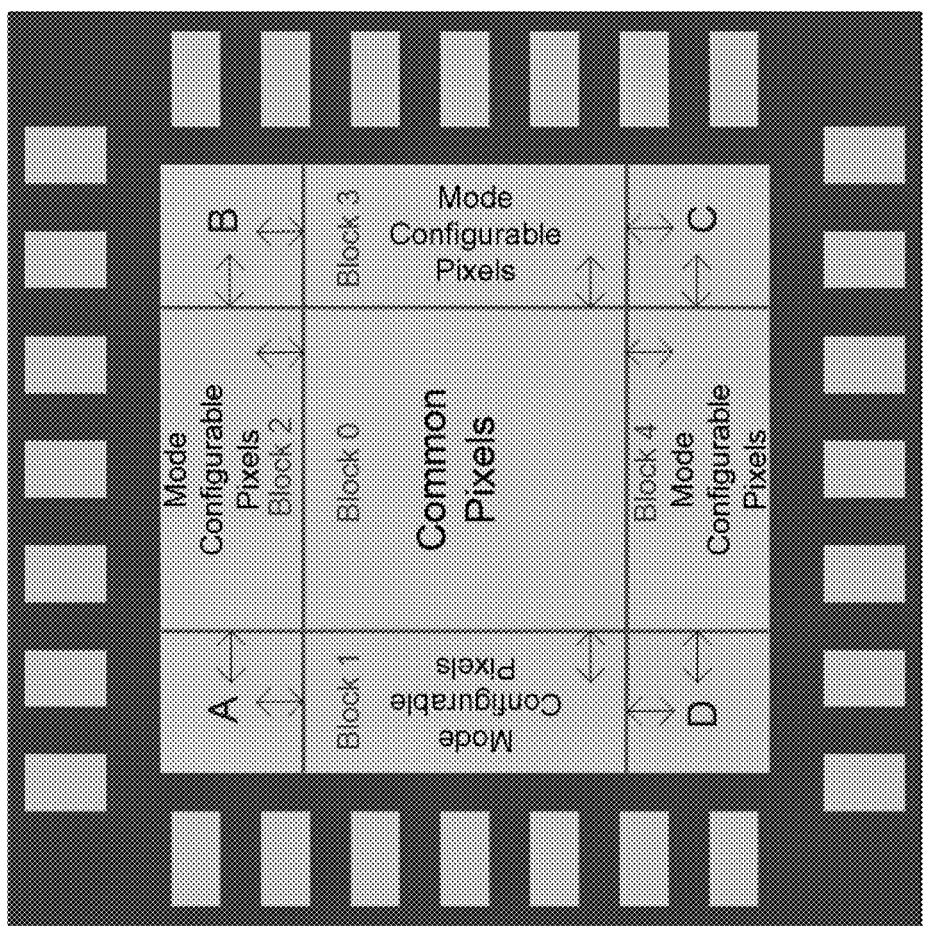
FIG. 11 shows a single camera integrated circuit with movable frames and adjustable aspect ratios.
Figure 12:
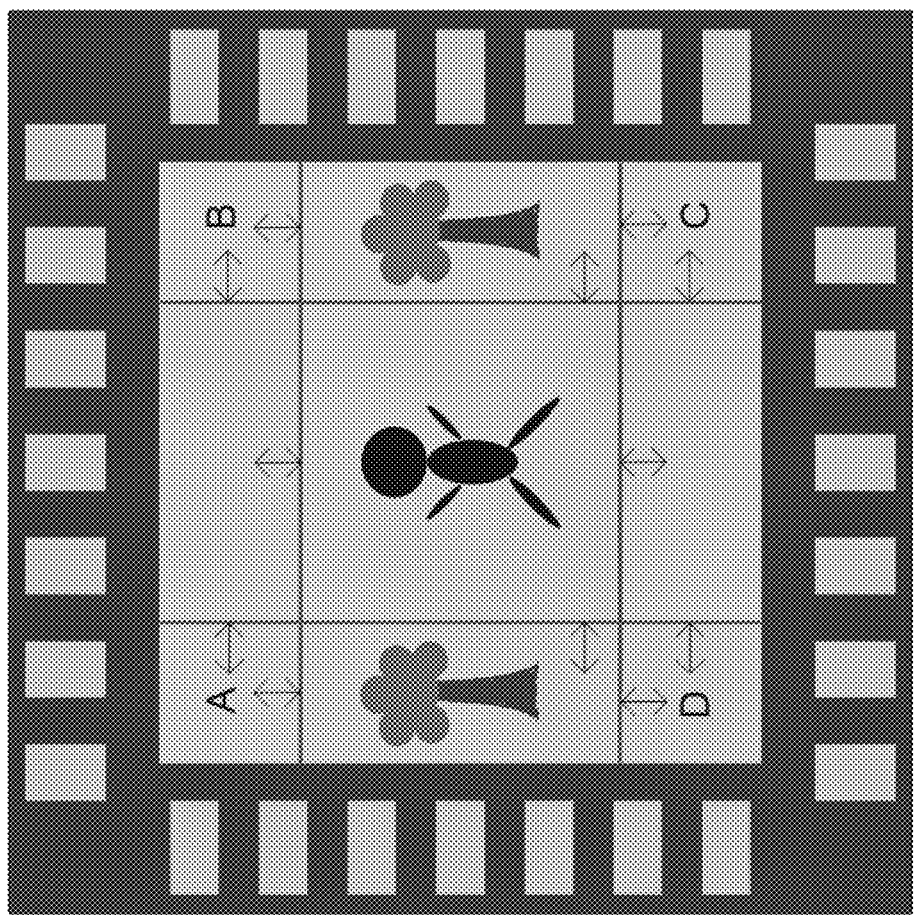
FIG. 12 shows an example of movable frames and adjustable aspect ratios.
Figure 13:
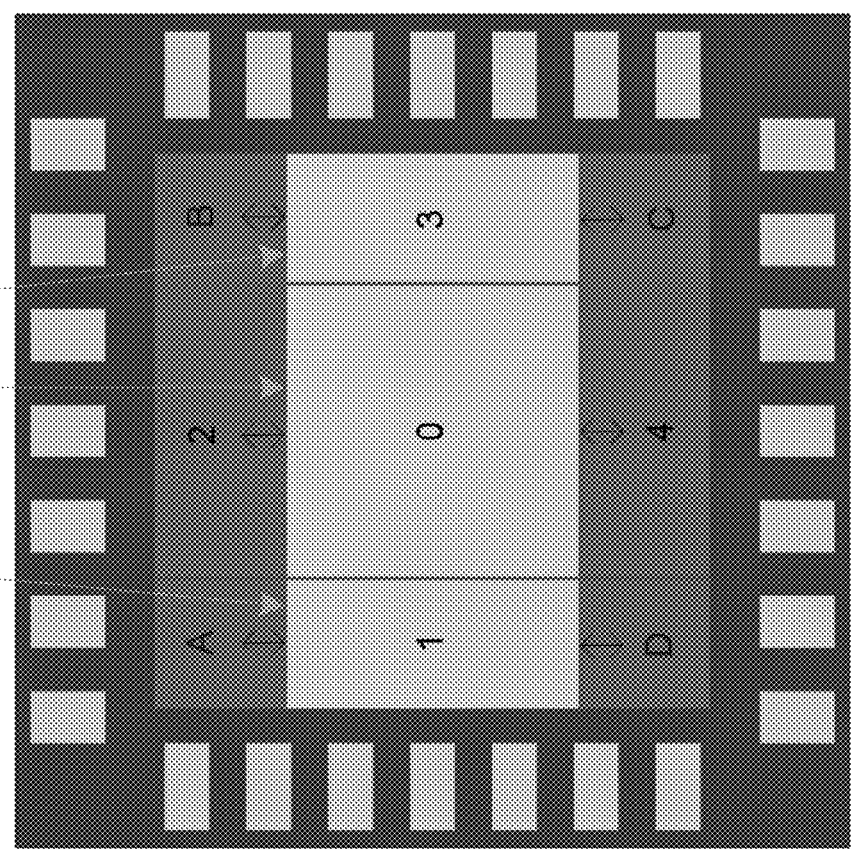
FIG. 13 shows a movable captured landscape frame and adjustable aspect ratio.
Figure 14:
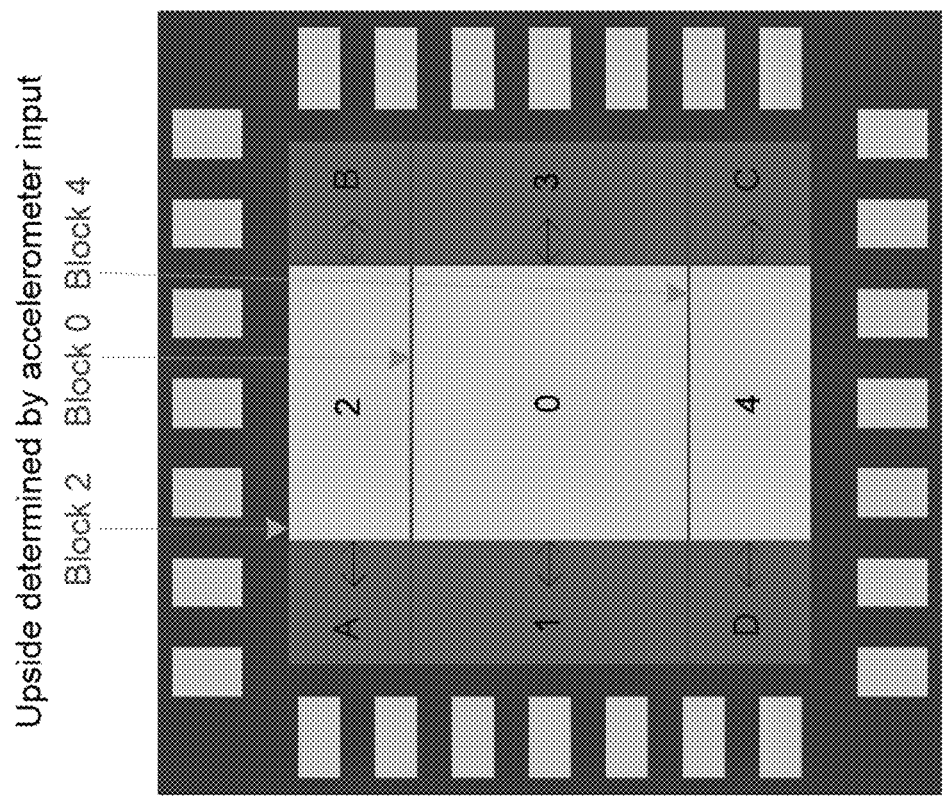
FIG. 14 shows a movable captured portrait frame and adjustable aspect ratio.

Referring to FIG. 11, to produce a landscape image, the image sensor/processor joins images of blocks 1, 0 and 3; and to produce a portrait image, the image sensor/processor joins images of blocks 2, 0 and 4. The "up" side of each block, (refer to FIGS. 13 and 14), is determined by an input from the accelerometer fitted on the image capture device.

As the window frames, landscape and portrait, are moved, those pixels in blocks A, B, C and D, that were previously inactive are now active, and were previously active are now inactive. For example, if a landscape frame is moved up by 10 row pixels, the respective 10 row pixels from the frame upper edge in blocks A and B that were previously inactive are now active, and the respective 10 row pixels from the frame lower edge in blocks C and D that were previously active are now inactive. As a result, the pixel blocks 1, 0 and 3 move up by 10 row pixels.

Similarly, if a portrait frame is moved to the right by 10 column pixels, the respective 10 column pixels from the frame right edge in blocks B and C that were previously inactive are now active, and the respective 10 column pixels from the frame left edge in blocks A and D that were previously active are now inactive. As a result, the pixel blocks 2, 0 and 4 move to the right by 10 column pixels.

In some embodiments, the edges of landscape frame and portrait frame can be moved synchronously as in moving frames or independently as in adjusting aspect ratios.

In various embodiments, the total area of the image sensor dimension may be a square or a rectangle in shape.

As an example, in a capturing session, the user, viewing the subjects through the viewfinder or on the preview screen, selecting the portrait frame as a reference frame and while keeping the portrait frame steady, proceeds to electronically center the subject within the landscape frame, and captures both images simultaneously.

The camera, by default setting or by user selection, can activate the unused corner pixels of blocks A, B, C and D for the purpose of image improvement. The corner pixels of an image sensor typically receive less incident light than the center pixels. This is due to a number of factors, including:

Lens vignetting: Vignetting is a phenomenon where the corners of an image are darker than the center. This is because the lens does not focus light evenly across the entire image plane. The corners of the image plane are typically furthest from the center of the lens, so they receive less light.

Lens Hood: If a lens hood is used, it can partially block light from entering the corners of the sensor, leading to reduced illumination in those areas.

Sensor geometry: The pixels at the corners of an image sensor are typically arranged in a way that makes them less sensitive to light. In some cases, the sensor size may not perfectly match the image circle projected by the lens. This can result in reduced light reaching the corners of the sensor.

Optical Design: The optical design of the lens and the sensor stack (layers of glass, filters, and micro lenses) can affect how evenly light is distributed across the sensor surface.

The image sensor/processor can apply correction techniques to compensate for vignetting and ensure more uniform illumination across the sensor. This may involve post-processing in the camera or software corrections during image processing.

Techniques for centering images within the frames may be accomplished by utilizing artificial intelligence (A1). Artificial intelligence can be used to enhance image sensor performance by recognizing and processing different subjects within images, such as people, animals, and landscapes. This can lead to improvements in tasks like image classification, object detection, and even image enhancement, helping cameras and sensors capture better-quality images in various scenarios.

Furthermore, A1 can improve image quality either by acting on the processed image itself. Deploying A1-based algorithms directly on the sensor data provides additional degrees of freedom which can be leveraged to unlock hidden potential for improving image quality.

Some embodiments may allow the user to dynamically move the captured frames, to adjust the captured aspect ratios prior to simultaneously capturing landscape and portrait images. It also eliminates the need of rotating the camera when capturing portrait images. Thus providing the convenience, the flexibility, increasing productivity and making "rotating the camera" the thing of the past.

A second set of technical solutions may comprise the following.

1. An image sensor apparatus, comprising: a plurality of image sensors organized into a plurality of portions, wherein the plurality of portions comprise: a first portion, a second portion and a third portion configured to capture, in combination with each other, an image in a landscape format, a fourth portion and a fifth portion configured to capture, in combination with the first portion, an image in a portrait format. FIGS. 1 to 5 and 11-14 and associated description disclose some embodiments of such an image sensor apparatus. For example, first portion, second portion and third portion may be blocks 0, 1 and 3 depicted in FIG. 1 or FIG. 11, and the fourth and the fifth portion may correspond to blocks 2 and 4 of FIG. 1 or FIG. 11.

2. The image sensor apparatus of solution 1, further including: a first corner portion and a second corner portion configured to capture the image in the landscape format according to a vertical position adjustment during the capture. For example, referring to FIGS. 11-14, the first and the second corner portions may comprise either A and B or C and D which may be used to capture landscape image depending on whether the image is vertically centered or is moved up or down according to a user decision or a machine automated decision.

3. The image sensor apparatus of solution 1-2, further including: a third corner portion and a fourth corner portion configured to capture the image in the portrait format according to a horizontal position adjustment during the capture. For example, referring to FIGS. 11-14, the first and the second corner portions may comprise either A and D or B and C, which may be used to capture portrait image depending on whether the image is horizontally centered or is moved left or right according to a user decision or a machine automated decision.

4. The apparatus of solution 1-3, further including: a first corner portion and a second corner portion configured to capture the image in the landscape format according to a vertical position adjustment during the capture; and a third corner portion and a fourth corner portion configured to capture the image in the portrait format according to a horizontal position adjustment during the capture. The corner portions A, B, C and D respectively, depicted in FIGS. 11 to 14 provide some example embodiments.

5. The apparatus of solution 1-4, wherein the second portion is configured to capture a left-end portion of the image in the landscape format and the third portion is configured to capture a right-end portion (e.g., block 3) of the image in the landscape format. In this case, for example, the left end portion may correspond to block 1.

6. The apparatus of solution 1-5, wherein the third portion is configured to capture a top-end portion of the image in the portrait format and the fourth portion is configured to capture a bottom-end portion (e.g., block 4) of the image in the portrait format. In this case, for example, the top end portion may correspond to block 2.

7. The apparatus of solution 1-6, further comprising a media processor, wherein the media processor is electrically connected to the first, second, third, fourth, and fifth portions of the plurality of image sensors.

8. The apparatus of solution 1-7, wherein the plurality of sensor image sensors is arranged in a square shape.

9. The apparatus of solution 4-8, further including one or more processors configured to control activate or deactivate image sensors of the first corner portion, the second corner portion, the third corner portion and the fourth corner portion responsive to the vertical position adjustment and/or the horizontal portion adjustment.

10. The apparatus of solution 9, wherein the vertical position adjustment and/or the vertical position adjustment is responsive to an input on a user interface.

11. The apparatus of solution 9, wherein the vertical position adjustment and/or the vertical position adjustment is responsive to a pose determination algorithm executed by the one or more processors.

12. An image sensor apparatus, comprising: a plurality of sensors that includes non-overlapping portions including: a first portion; a second portion; a third portion; a fourth portion; a fifth portion; a processor coupled to the second portion, the third portion, the fourth portion and the fifth portion, wherein the processor is configured to: determining an orientation of the image sensor apparatus, and performing a selective disabling operation based on the orientation such that in case that the orientation is a portrait format, a first subset of sensors is disabled; and in case that the orientation is a landscape format, a second subset of sensors is disabled, where the second subset of sensors in different from the first subset of sensors. As described in the present document, the orientation sensor 1106 may be used to provide orientation input to the one or more sensors. Alternatively, user input may provide orientation input to the processor.

13. The image sensor apparatus of solution 12, wherein the first subset of sensors comprises at least some sensors from the second portion and the fourth portion.

14. The image sensor apparatus of solution 12-13, wherein the second subset of sensors comprises at least some sensors from the third portion and the fifth portion.

15. The image sensor apparatus of solution 12-13, wherein the processor is configured to determine the orientation using an input received at a user interface or using an orientation sensor.

16. The image sensor apparatus of solution 12-13, wherein the processor is further configured to move an upper edge or a lower edge or a left edge or a right edge of sensors of the plurality of sensors that are activated during an image capture based on a vertical position adjustment or a horizontal position adjustment.

17. The image sensor apparatus of solution 16, wherein the vertical position adjustment or the horizontal position adjustment is performed by an artificial intelligence algorithm.

18. An image capture system (e.g., system 1600 in FIG. 16 and additional views in FIG. 17), comprising: a plurality of sensor arrays comprising: a first sensor array (1612) and a second sensor array (1616) that are configured to store portions of an image captured in a landscape format; a third sensor array (1614) and a fourth sensor array (1618) that are configured to store portions of an image captured in a portrait format; a fifth sensor array (1620) configured to store a portion of the image captured in the landscape format and a portion of the image captured in the portrait format; and a plurality of lenses comprising: a first lens (1602) disposed to cause incident light to fall upon the first sensor array; a second lens (1606) disposed to cause the incident light to fall upon the second sensor array; a third lens (1604) disposed to cause the incident light to fall upon the third sensor array; a fourth lens (1608) disposed to cause the incident light to fall upon the fourth sensor array; a fifth lens (1610) disposed to cause the incident light to fall upon the fifth sensor array.

Figure 16:
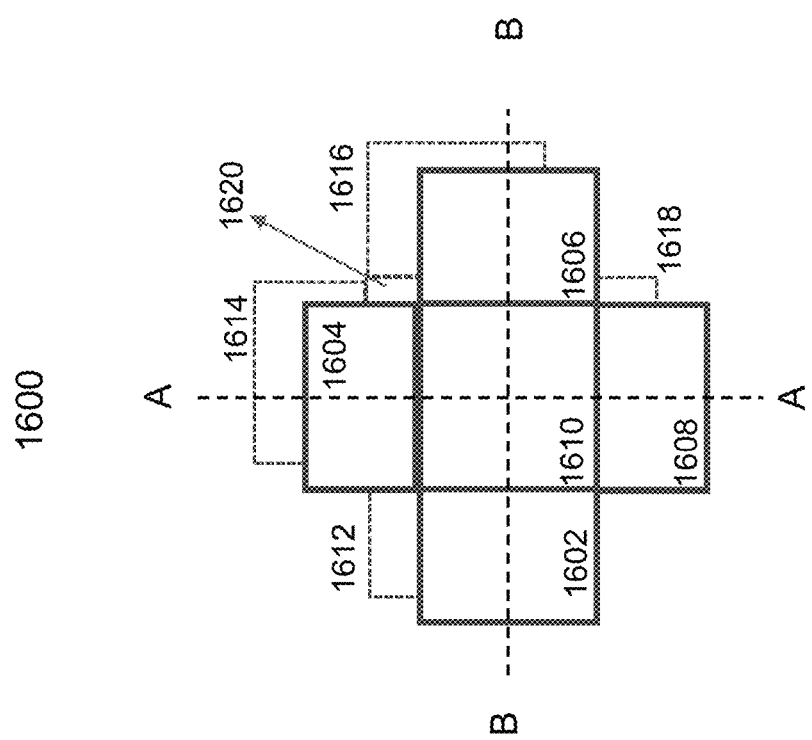
FIG. 16 shows an example configuration of a multi-lens camera configuration.

FIG. 16 shows a view of the image capture system from the direction of entry of light, looking slightly from the left top viewpoint, with the sensor arrays shown by dashed lines to indicate that they are behind (or below) the lenses. Although lenses and arrays are shown as rectangular or square in portion, in various embodiments, different shapes such as circular shape may be used. Furthermore, in various embodiments a lens and a corresponding sensor array may have one to one size correspondence or may have different coverage. For example, some or all lenses may be configured to allow some overlap between captured images to allow seamless image generation.

Figure 17:
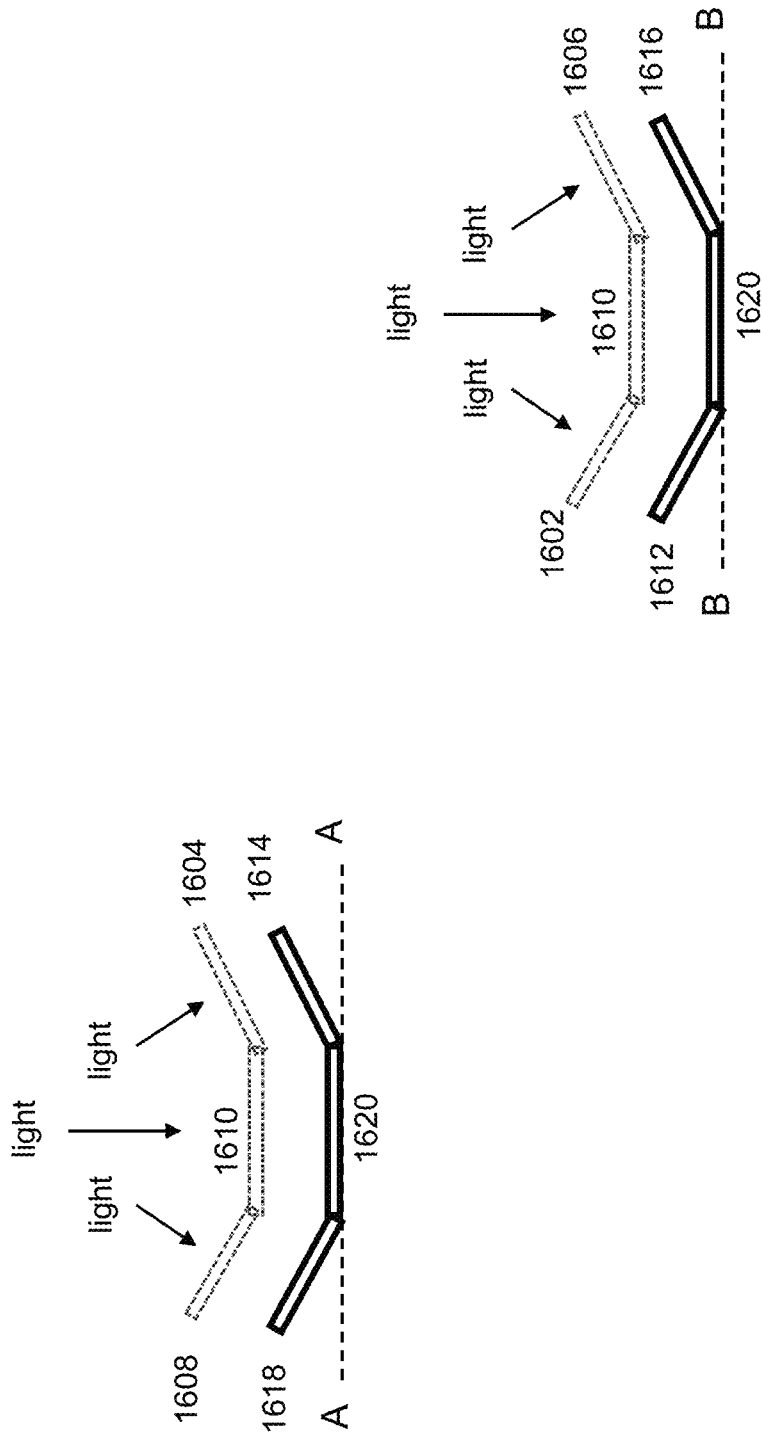
FIG. 17 shows example side views of a narrow capture angle multi-lens camera configuration.

FIG. 17 shows a side view from perspective of A-A symmetry line and another side view from perspective of B-B symmetry line. Although distances between lenses and sensor arrays are shown to be relatively uniform, in general these distances may not be identical. The configuration shown in FIG. 17 may be suitable to capture narrow angle images due to the sensor arrays and lenses being tilted towards the light source and towards to object(s) whose image or video is being captured.

FIG. 18 shows a side view from perspective of A-A symmetry line and another side view from perspective of B-B symmetry line. Although distances between lenses and sensor arrays are shown to be relatively uniform, in general these distances may not be identical. The configuration shown in FIG. 18 may be suitable to capture wide angle images due to the sensor arrays and lenses being tilted away from the light source and away to object(s) whose image or video is being captured. It will be appreciated by a person of skill that such a outwardly opening wing shaped structure of lenses and corresponding sensor arrays will allow a wider angle capture in terms of angular range of the captured image. For example, the lenses could be arranged to be near-orthogonal to the middle lens, allowing capture of 180 degrees view in one single image.

19. The image capture system of solution 18, wherein the first lens, the second lens, the third lens and the fourth lens are tilted with respect to a plane of the fifth lens.

20. The image capture system of solution 18 or 19, wherein the first sensor array, the second sensor array, the third sensor array and the fourth sensor array are tilted with respect to a plan of the fifth sensor array. In some embodiments, the tilting angle of the left-side lens and the right-side lens may be same. This arrangement may thus allow symmetrical coverage of captured viewpoint. In some embodiments, the two tilting angles may be different. For example, if the left lens is tilted with a larger obtuse angle, the camera may be suitable for capturing a left-hand side visual information with a wider angle. Similarly, in some cases, the right-side lens may be tilted by a more obtuse angle. Such an asymmetric arrangement of lenses and the corresponding image sensor arrays may be suitable for applications where field of vision may be asymmetric, e.g., cameras deployed at corners of buildings of rooms and having different angular coverage of fields of vision. Asymmetry of tilt angle may also work similarly for the top and bottom sensor array/lens combinations.

21. The image capture system of solution 18-20, wherein the first lens and the first sensor array are disposed in parallel planes with a first distance, the second lens and the second sensor array are disposed in parallel planes with a second distance, the third lens and the third sensor array are disposed in parallel planes with a third distance, the fourth lens and the fourth sensor array are disposed in parallel planes with a fourth distance, the fifth lens and the fifth sensor array are disposed in parallel planes with a fifth distance. In some embodiments, the separations between the lenses and the image arrays may be identical, e.g., when all lenses have similar focal length/aperture characteristics. Alternatively, in some embodiments, lenses with different focal lengths or apertures may be used, such that the corresponding distance between the image sensor array and the lens may be different. Such an arrangement may be advantageously used to allow different densities of capture of images . . . e.g., the overlap portion of landscape/portrait images may be captured at a higher sensor density than the non-overlapping portions.

Additional technical solutions may include:

where the sensor arrays are not on the same plane to provide depth information, where the spectral response of sensor arrays or sensor portions varies (to give multi-spectral images) based on their position within the array, where the resolution of the side sensors (e.g., the sensor portions exclusively used for landscape or portrait capture) is different than the center one or different between the different wings, where color configuration is different for side sensor portions than the center (common) array where blocks 0,1,3 are for one sensor and blocks 2 and 4 are additional where the capture speed of each of the sensor array differs allowing different exposure pan and tilt visual effects for video capture, where different lenses have different optical properties such as focal length, aperture, etc.

In the present document, the terms "sensors" and "image sensors" may includes embodiments that capture light in visible spectrum. In some embodiments, the sensors or image sensors may capture and electronically reproduce images using light energy above or below wavelengths of the visible spectrum of light.

In the present document, the term "array" is used to signify use of sensors to capture image in two dimensions (e.g., height and width) and need not necessarily mean that the sensors are uniformly physically laid out in an array of uniform separation among sensors.

In some embodiments, a method of operating an image capture system includes operating an image processing described by the above solutions to capture an image or a video.

In some embodiments, a software algorithm may be executed on one or more processors includes in the image capture system, wherein the software algorithm is configured to control image capture using one or more of the above-discloses sensor arrays or sensor portions. Additionally, in some embodiments, video capture may be performed. In some embodiments, the one or more processors may further control one or more flashes that cause a flash to activate to illuminate a surrounding area—once or in a sequence—to capture images or video.

It will further be appreciated that the discloses sensor arrays and portions and lenses may be disposed within a mobile phone, a camera, an unmanned aerial vehicles such as a drone, and so on. Furthermore, it will be appreciated that various video or image capture maneuvers such as pan or tilt may be supported by the discloses image capture systems.

It will further be appreciated that the disclosed image capture systems may include a user interface such as a display on which a user may be able to provide input about setting the camera in portrait (height of capture>width of capture) or landscape (width of capture>height of capture) format for image capture.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. An image sensor apparatus, comprising:
a plurality of image sensors organized into a plurality of portions, wherein the plurality of portions comprise:
a first portion, a second portion and a third portion configured to capture, in combination with each other, an image in a landscape format,
a fourth portion and a fifth portion configured to capture, in combination with the first portion, an image in a portrait format.

2. The image sensor apparatus of claim 1, further including:
a first corner portion and a second corner portion configured to capture the image in the landscape format according to a vertical position adjustment during the capture.

3. The image sensor apparatus of claim 1, further including:
a third corner portion and a fourth corner portion configured to capture the image in the portrait format according to a horizontal position adjustment during the capture.

4. The apparatus of claim 1, further including:
a first corner portion and a second corner portion configured to capture the image in the landscape format according to a vertical position adjustment during the capture; and
a third corner portion and a fourth corner portion configured to capture the image in the portrait format according to a horizontal position adjustment during the capture.

5. The apparatus of claim 1, wherein the second portion is configured to capture a left-end portion of the image in the landscape format and the third portion is configured to capture a right-end portion of the image in the landscape format.

6. The apparatus of claim 1, wherein the third portion is configured to capture a top-end portion of the image in the portrait format and the fourth portion is configured to capture a bottom-end portion of the image in the portrait format.

7. The apparatus of claim 1, further comprising a media processor, wherein the media processor is electrically connected to the first, second, third, fourth, and fifth portions of the plurality of image sensors.

8. The apparatus of claim 1, wherein the plurality of sensor image sensors is arranged in a square shape.

9. The apparatus of claim 4, further including one or more processors configured to control activate or deactivate image sensors of the first corner portion, the second corner portion, the third corner portion and the fourth corner portion responsive to the vertical position adjustment and/or the horizontal portion adjustment.

10. The apparatus of claim 9, wherein the vertical position adjustment and/or the horizontal position adjustment is responsive to an input on a user interface.

11. The apparatus of claim 9, wherein the vertical position adjustment and/or the horizontal position adjustment is responsive to a pose determination algorithm executed by the one or more processors.

12. An image sensor apparatus, comprising:
a plurality of sensors that includes non-overlapping portions including:
a first portion;
a second portion;
a third portion;
a fourth portion;
a fifth portion;
a processor coupled to the second portion, the third portion, the fourth portion and the fifth portion, wherein the processor is configured to:
determining an orientation of the image sensor apparatus, and
performing a selective disabling operation based on the orientation such that:
in case that the orientation is a portrait format, a first subset of sensors is disabled; and
in case that the orientation is a landscape format, a second subset of sensors is disabled,
where the second subset of sensors is different from the first subset of sensors.

13. The image sensor apparatus of claim 12, wherein the first subset of sensors comprises at least some sensors from the second portion and the fourth portion.

14. The image sensor apparatus of claim 12, wherein the second subset of sensors comprises at least some sensors from the third portion and the fifth portion.

15. The image sensor apparatus of claim 12, wherein the processor is configured to determine the orientation using an input received at a user interface or using an orientation sensor.

16. The image sensor apparatus of claim 12, wherein the processor is further configured to move an upper edge or a lower edge or a left edge or a right edge of sensors of the plurality of sensors that are activated during an image capture based on a vertical position adjustment or a horizontal position adjustment.

17. The image sensor apparatus of claim 16, wherein the vertical position adjustment or the horizontal position adjustment is performed by an artificial intelligence algorithm.

18. An image capture system, comprising:
a plurality of sensor arrays comprising:
a first sensor array and a second sensor array that are configured to store portions of an image captured in a landscape format;
a third sensor array and a fourth sensor array that are configured to store portions of an image captured in a portrait format;
a fifth sensor array configured to store a portion of the image captured in the landscape format and a portion of the image captured in the portrait format; and
a plurality of lenses comprising:
a first lens disposed to cause incident light to fall upon the first sensor array;
a second lens disposed to cause the incident light to fall upon the second sensor array;
a third lens disposed to cause the incident light to fall upon the third sensor array;
a fourth lens disposed to cause the incident light to fall upon the fourth sensor array;
a fifth lens disposed to cause the incident light to fall upon the fifth sensor array.

19. The image capture system of claim 18, wherein the first lens, the second lens, the third lens and the fourth lens are tilted with respect to a plane of the fifth lens.

20. The image capture system of claim 19, wherein the first sensor array, the second sensor array, the third sensor array and the fourth sensor array are tilted with respect to a plan of the fifth sensor array.

21. The image capture system of claim 20, wherein
the first lens and the first sensor array are disposed in parallel planes with a first distance, the second lens and the second sensor array are disposed in parallel planes with a second distance, the third lens and the third sensor array are disposed in parallel planes with a third distance, the fourth lens and the fourth sensor array are disposed in parallel planes with a fourth distance, the fifth lens and the fifth sensor array are disposed in parallel planes with a fifth distance.

\* \* \* \* \*